US006434739B1

(12) United States Patent
Branson et al.

(10) Patent No.: US 6,434,739 B1
(45) Date of Patent: Aug. 13, 2002

(54) OBJECT ORIENTED FRAMEWORK MECHANISM FOR MULTI-TARGET SOURCE CODE PROCESSING

(75) Inventors: Michael John Branson, Rochester; David Joseph Misheski, Plainview; Stephen Matthew Stupca, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 08/636,211

(22) Filed: Apr. 22, 1996

(51) Int. Cl.$^7$ ................................................ G06F 9/44

(52) U.S. Cl. .................... 717/108; 717/121; 707/103 R

(58) Field of Search ................................. 395/701, 705, 395/685; 717/100–109, 120–123, 136; 707/103 R, 103 Y, 103, 103 Z; 709/315

(56) References Cited

U.S. PATENT DOCUMENTS

| | | | |
|---|---|---|---|
| 4,943,932 A | 7/1990 | Lark et al. | 364/513 |
| 5,057,996 A | 10/1991 | Cutler et al. | 364/200 |
| 5,101,364 A | 3/1992 | Davenport et al. | 395/152 |

(List continued on next page.)

FOREIGN PATENT DOCUMENTS

| | | |
|---|---|---|
| JP | 06103075 A | 4/1994 |
| JP | 07044365 A | 2/1995 |
| JP | 07225685 A | 8/1995 |
| JP | 08008777 A | 1/1996 |
| WO | WO95/00901 | 1/1995 |
| WO | WO95/00903 | 1/1995 |
| WO | WO95/00904 | 1/1995 |
| WO | WO95/17720 | 6/1995 |

OTHER PUBLICATIONS

I. S. Law, "Liaison: An Intelligent Rule Driven Interface for Software Engineering Environments," Proceedings of the Annual International Computer Software and Applications Conference (COMPSAC), Chicago, Oct. 5–7, 1988, pp. 402–409.

V. K. Wadhwa et al., "Computer–Aided Software Engineering Facility," International Publication WO 91/08543 (Seer Technologies, Inc), Jun. 13, 1991.

Text of IBM Technical Disclosure Bulletin, vol. 37, DeBinder et al., Feb. 1994, "Results Folder Framework", pp. 431–432.

Text of IBM Technical Disclosure Bulletin, vol. 36, Coskun, N., Jun. 1993, "Persistent Framework Independent Record/Playback Framework", pp. 261–264.

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

(List continued on next page.)

Primary Examiner—Kakali Chaki
(74) Attorney, Agent, or Firm—Martin & Associates, LLC; Derek P. Martin

(57) ABSTRACT

An object oriented framework for source code processing provides an infrastructure that embodies the steps necessary to process source code and a mechanism to extend the framework to fit a particular scenario for processing source code. Certain core functions are provided by the framework, which interact with extensible functions provided by the framework user. The architecture of the framework allows a developer to select the native processing tool of their choice, and provides an infrastructure for using that processing tool with other platforms (e.g., targets, etc.) The extensible functions allow the processing tools of a new platform to be easily incorporated into the framework. The framework thus allows a programming environment with development on multiple platforms that targets multiple platforms, which may be easily customized to include new platforms and new processing tools.

72 Claims, 16 Drawing Sheets

U.S. PATENT DOCUMENTS

| | | | |
|---|---|---|---|
| 5,119,475 A | 6/1992 | Smith et al. | 395/156 |
| 5,181,162 A | 1/1993 | Smith et al. | 364/419 |
| 5,195,172 A | 3/1993 | Elad et al. | 395/50 |
| 5,226,161 A | 7/1993 | Khoyi et al. | 395/650 |
| 5,247,693 A | 9/1993 | Bristol | 395/800 |
| 5,249,270 A | 9/1993 | Stewart et al. | 395/200 |
| 5,257,384 A | 10/1993 | Farrand et al. | 395/725 |
| 5,261,080 A | 11/1993 | Khoyi et al. | 395/500 |
| 5,274,572 A | 12/1993 | O'Neill et al. | 364/550 |
| 5,276,775 A | 1/1994 | Meng | 395/55 |
| 5,287,447 A | 2/1994 | Miller et al. | 395/157 |
| 5,293,470 A | 3/1994 | Birch et al. | 395/135 |
| 5,297,283 A | 3/1994 | Kelly, Jr. et al. | 395/650 |
| 5,315,703 A | 5/1994 | Matheny et al. | 395/164 |
| 5,325,533 A | 6/1994 | McInerney et al. | 395/700 |
| 5,367,633 A | 11/1994 | Matheny et al. | 395/164 |
| 5,369,766 A | 11/1994 | Nakano et al. | 395/700 |
| 5,379,430 A | 1/1995 | Nguyen | 395/700 |
| 5,388,264 A | 2/1995 | Tobias, II et al. | 395/650 |
| 5,390,325 A | 2/1995 | Miller | 395/575 |
| 5,396,626 A | 3/1995 | Nguyen | 395/700 |
| 5,398,336 A | 3/1995 | Tantry et al. | 395/600 |
| 5,475,845 A * | 12/1995 | Orton et al. | 395/700 |
| 5,553,282 A | 9/1996 | Parrish et al. | 395/600 |
| 5,630,131 A * | 5/1997 | Palevich et al. | 395/701 |

OTHER PUBLICATIONS

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object–Oriented Application Processing Apparatus".

Abstract from WIPO Patent Application No. WO 9422081, Sep. 29, 1994, "Hardware–Independent Interface for Interrupt Processing", G. O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

Abstract for WIPO Patent Application No. 94/19740, Goldsmith et al., Sep. 1, 1994, "Framework Processor of Object–Oriented Application".

Abstract from WIPO Patent Application No. WO 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract fpr WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–to–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint–Based Representations of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Oingzhong et al., 1992, "An Object–Oriented Model for Ingelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4664213, "Maintaining Information about Persistent Replicated Objects in a Distributed System", 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J. D. Grimes, 1993, "Objects 101–An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".
Inspec Abstract No. 4622794, from Campbell et al., 1993, "A Technique for Documenting the Framework of an Object–Oriented System".
Inspec Abstract No. 4618974, from Bowers, 1993, "Some Principles for the Encapsulation of the Behaviour of Aggregate Objects".
Inspec Abstract No. 461931, from Islan et al, 1993, "Uniform Co–Scheduling Using Object–Oriented Design Techniques".
Inspec Abstract No. 4613481, from Thieme et al., 1993, "Schema Integration in Object–Oriented Databases".
Inspec Abstract No. 4603430, from G. Booch, 1994, "Designing an Application Framework".
Inspec Abstract No. 4596323, from Frank et al., 1993, "An Integrated Environment for Designing Object–Oriented Enterprise Models".
Inspec Abstract No. 4593721, Periyasamy et al., 1993, "A Formal Framework for Design and Verification of Robotic Agents".
Inspec Abstract No. 4588839, from L. Fisher, 1992, "Constructing a Class Library for Microsoft Windows".
Inspec Abstract No. 4588834, from G. Olander, 1992, "Chembench: Redesign of a Large Commercial Application Using Object–Oriented Techniques".
Inspec Abstract No. 4566447, from J. Rossazza, 1992, "An Object–Centered Fuzzy Representation".
Inspec Abstract No. 4565630, from Karpovich et al, 1993, "A Parallel Object–Oriented Framework for Stencil Algorithms".
Inspec Abstract No. C9402–6150G–002, from Bruegge et al., 1993, "A Framework for Dynamic Program Analyzers".
Inspec Abstract No. 4550414, from Parrish et al., 1993, "Automated Flow Graph–Based Testing of Object–Oriented Software Modules".
Inspec Abstract No. 4540729, from Bailes et al., "The Ecology of Class Refinement".
Inspec Abstract No. 4534334, from Campbell et al., 1991, "A Technique for Documenting the Framework of an Object–Oriented System".
Inspec Abstract No. 4534330, from Istavrinos et al., 1992, "Experiences with an Object–Oriented Mapper for Coherent Distributed Shared Memory".
Inspec Abstract No. 4528985, from Beneventano et al., 1993, "Taxonomic Reasoning with Cycles in LOGIDATA+".
Inspec Abstract No. 4525743, from Hakimzadeh et al., 1993, "Instance Variable Access Locking for Object–Oriented Databases".
Inspec Abstract No. 4512593, from H. Sakai, 1993, "A Method for Contract Design and Delegation in Object Behavior Modeling".
Inspec Abstract No. B9310–6210L–099, "Templates, Types and Classes in Open Distributed Processing", 1993.
Inspec Abstract No. 4459325, from Kesim et al., 1992, "On the Evolution of Objects in a Logic Programming Framework".
Inspec Abstract No. 4447153, from Klein et al., 1992, "An Object–Oriented Framework for Curves and Surfaces".
Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".
Inspec Abstract No. 4417604, from Kraiem et al., 1992, "Mapping of Conceptual Specifications Into Object–Oriented Programs".
Inspec Abstract No. 4417563, from E. Maim, 1992, "Recognizing Objects from Constraints".
Inspec Abstract No. 4411998, from Yi Deng et al., 1992, "Unifying Multi–Paradigms in Software System Design".
Inspec Abstract No. 4408394, from Allen et al., 1992, "GEM: Global Event Management in CAD Frameworks".
Inspec Abstract No. 4400350, from Y. Shoham, 1993, "Agent–Oriented Programming".
Inspec Abstract No. 4395549, from Hogstrom et al., 1992, "Portability and Data Structures in Scientific Computing–Object–Oriented Design of Utility Routines in Fortran".
Inspec Abstract No. 4391388, from Thomas et al., 1992, "A Generic Object–Oriented Concurrency Mechanism for Extensibility and Reuse of Synchronization Components".
Inspec Abstract No. 4387201, from Chu et al., 1992, "A Pattern Based Approach of Integrating Data and Knowledge to Support Cooperative Query Answering".
Inspec Abstract No. 4366189, from Holt et al., 1992, "A Framework for Using Formal Methods in Object–Oriented Software Development".
Inspec Abstract No. 4356300, from Bertino et al., 1993, "Path–Index: An Approach to the Efficient Execution of Object–Oriented Queries".
Inspec Abstract No. 4341376, from Bertino et al., 1992, "Optimization of Object–Oriented Queries Using Path Indices".
Inspec Abstract No. 4331060, from Lau et al., 1992, "An Object–Oriented Class Library for Scalable Parallel Heuristic Search".
Inspec Abstract No. 4318465, from P. Madany, 1992, "Object–Oriented Framework for File Systems".
Inspec Abstract No. 4302722, from Eggenschwiler et al., 1992, "ET++SwapsManager: Using Object Technology in the Financial Engineering Domain".
Inspec Abstract No. 4298324, from S. Nichol, 1992, "Extending Turbo Vision".
Inspec Abstract No. 4297404, from Tanaka et al., 1992, "Two–Level Schemata and Generalized Links for Hypertext Database Models".
Inspec Abstract No. 4287814, from Natarajan et al., 1992, "Issues in Building Dynamic Real–Time Systems".
Inspec Abstract No. 4281362, from Marhshall et al., 1991, "Using VDM within an Object–Oriented Framework".
Inspec Abstract No. 4275707, from Tsukamoto et al., 1991, "DOT: A Term Representation Using DOT Algebra for Knowledge–Bases".
Inspec Abstract No. 4275698, from Van den Bussche et al., 1991, "Evaluation and Optimization of Complex Object Selections".
Inspec Abstract No. 4275693, from Giannotti et al., 1991, "Non–Determinism in Deductive Databases".
Inspec Abstract No. 4270361, from Artale et al., 1991, "Introducing Knowledge Representation Techniques in Database Models".
Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abastract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices, Frameworks and Refinement", R. H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "HOOD Nets".

Inspec Abstract No. C91072815, from Holtkamp et al, 1990, "DEMOM–A Description Based Media Object Data Model".

Inspec Abstract No. C91072016, from A. Lane, 1991, "/DOS/C++–Application Frameworks".

Inspec Abstract No. C91072574, from Hemery et al., "An Analysis of Communication and Multiprogramming in the Helios Operating System".

Inspec Abstract No. C91064787, from Madany et al, 1989, "A Class Hierarchy for Building Stream–Oriented File Systems".

Inspec Abstract No. C91064580, from Gamma et al., 1989, "Integration of a Programming Environment into ET++–A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al, 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Epxress Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga., 1985; "PROMPTER: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

* cited by examiner

OBJECT ORIENTED FRAMEWORK MECHANISM FOR MULTI-TARGET SOURCE CODE PROCESSING

FIELD OF THE INVENTION

The present invention relates in general to the data processing field. More specifically, the present invention relates to the field of Object Oriented framework mechanisms.

BACKGROUND OF THE INVENTION

The development of the EDVAC computer system of 1948 is often cited as the beginning of the computer era. Since that time, computer systems have evolved into extremely sophisticated devices. Due to competitive forces and differing performance requirements, a variety of different types of computers (i.e., platforms) have evolved. One of the primary differences between platforms is the operating system the platform uses. Each operating system provides different features, and the characteristics of platforms vary according to the specific operating system employed. Examples of popular operating systems include AIX, OS/2, MS-DOS, and Windows.

In the early years of computers, each different platform had a unique dedicated software development environment. The programming tools were written specifically for the platform on which they were to be used, and the software developed on a platform was typically run on the same platform. If a programmer needed to change from one platform to another, he or she would be faced with an entirely different set of programming tools on the new platform that would require a substantial time investment to acquire proficiency using these new tools. In addition, if a programmer needed to develop software targeted to more than one platform, this would generally require that the programmer have each of the target platforms on his or her desk, and that the programmer become proficient at using the development tools on each platform. In the alternative, developers of programming tools could port their processing tools from one platform to another. However, this approach is not economical due to the inherent inefficiencies of making the tools compatible with other platforms, and tool vendors have traditionally not offered this type of interplatform support for their tools.

Source code in any compiled language needs to be processed. In most cases, programs are not completely recompiled every time they are changed. Only the modules that are affected by the changes are recompiled to save on time and resources. Programming tools typically include processing tools that are generically referred to as "make tools." A make tool analyzes the various modules that comprise a computer program and only compile those modules that need to be compiled. Various different make tools exist for different platforms. For example, AIX has a processing tool known simply as "make." OS/2 has a similar processing tool called "nmake." Make tools are included in the group of source code processing tools that may be implemented within the framework. Make tools are also commonly referred to as processing tools or reprocessing tools. As used herein, the terms processing tool and reprocessing tool are used interchangeably to denote any type of programming tool (such as a make tool) that is typically specific to a particular programming environment (i.e., development platform).

The term "module" as used herein is a generic term for any portion of source code that may need to be processed. It may refer to a procedural routine or to an object. While the preferred embodiment herein is implemented using object oriented technology, the term module is used to distinguish a portion of source code that may need processing from objects in the framework.

An example will illustrate the problems associated with developing software on one development platform targeted to for different target platforms. If a programmer were developing software on an OS/2 development platform for an OS/2 target platform, for an MVS target platform, and for an AIX target platform, the programmer would typically develop the software once on the first platform (e.g., OS/2), process (i.e., compile) the software using the processing tool native to the first platform, make modifications to accommodate a second platform (e.g., MVS), process (or reprocess) the software using the processing tool native to the second platform, make modifications to accommodate the third platform (e.g., AIX), and process (or reprocess) the software using the processing tool native to the third platform. Note that this process requires a programmer to be proficient using the processing tools on all three target platforms. Each platform requires a substantial investment in time for a programmer to achieve proficiency using the programming tools (e.g., make tools) for that platform. In addition, becoming proficient in using three different sets of processing tools may be difficult due to the confusion that may be created by the different commands and protocols that each requires.

If a new target platform emerges, a programmer must now become familiar with all the programming tools for the new platform, including the reprocessing tools. There is currently no easy way for a programmer to extend existing processing tools for one platform to a second platform.

As more software is developed for numerous different target platforms, the need for better mechanisms for processing source code for multiple target platforms becomes more apparent and more acute. Without a mechanism that can be readily customized and extended to allow reprocessing on multiple target platforms using reprocessing tools native to one target platform, the rate of development of computer software will be impaired.

SUMMARY OF THE INVENTION

According to the present invention, an object oriented framework for source code processing provides an infrastructure that embodies the steps necessary to process source code and a mechanism to extend the framework to fit a particular scenario for processing source code. Certain core functions are provided by the framework, which interact with extensible functions provided by the framework user. The architecture of the framework allows a developer to select the native processing tool of their choice, and provides an infrastructure for using that processing tool with other platforms (eg., targets, etc.) The extensible functions allow the processing tools of a new platform to be easily incorporated into the framework. The framework thus allows a programming environment with development on multiple platforms that targets multiple platforms, which may be easily customized to include new platforms and new processing tools.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments section.

DESCRIPTION OF THE PREFERRED EMBODIMENTS

Overview—Object-Oriented Technology

Figure 1:
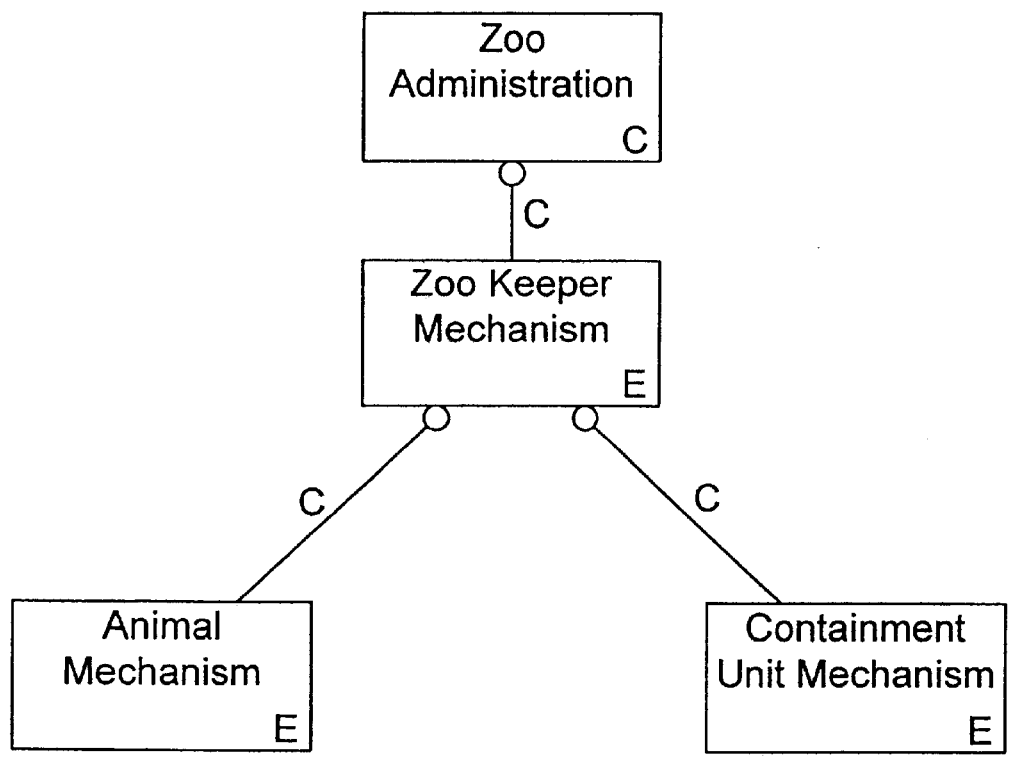
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the wordframework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 41–47). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2:
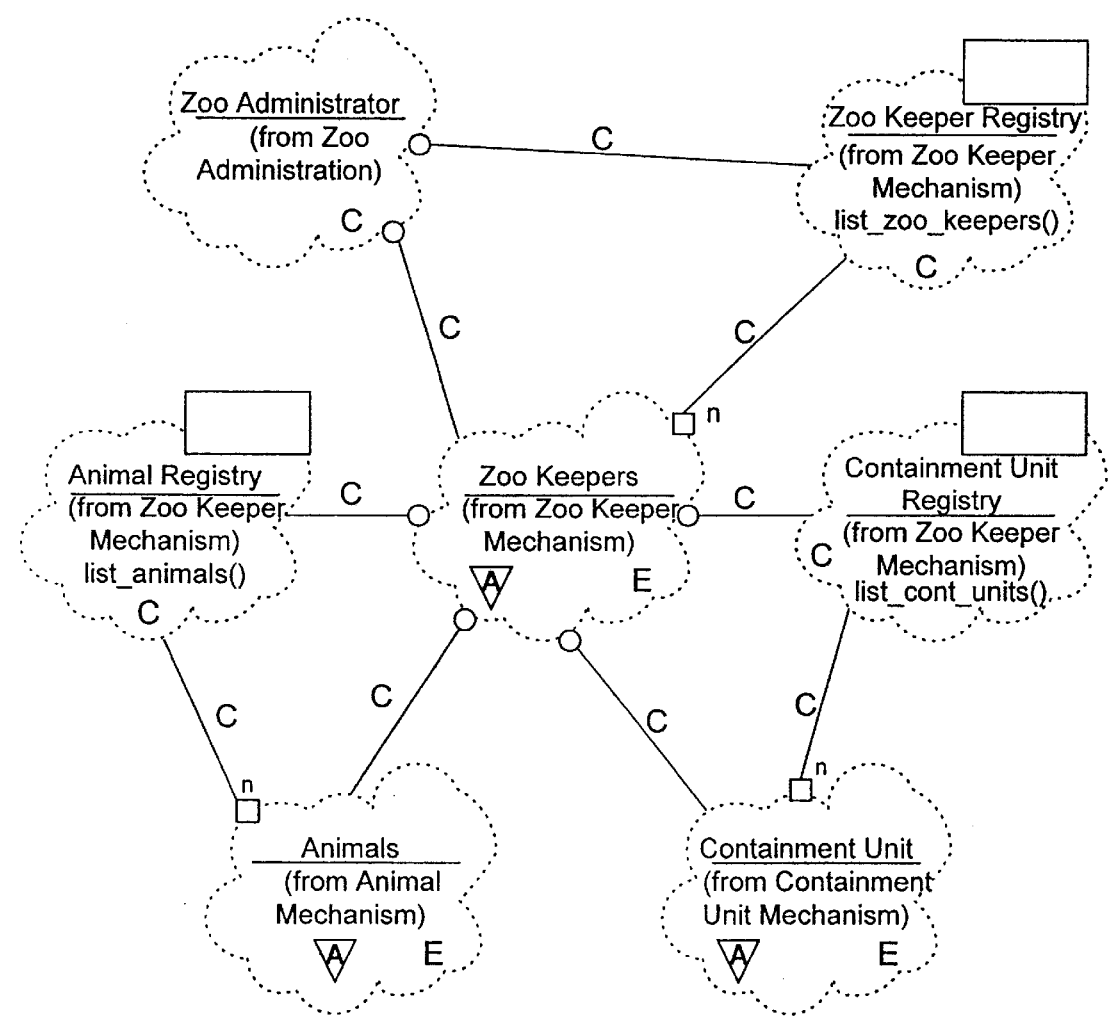
FIGS. 2 through 6 are class diagrams for the example framework mechanism of FIG. 1.

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
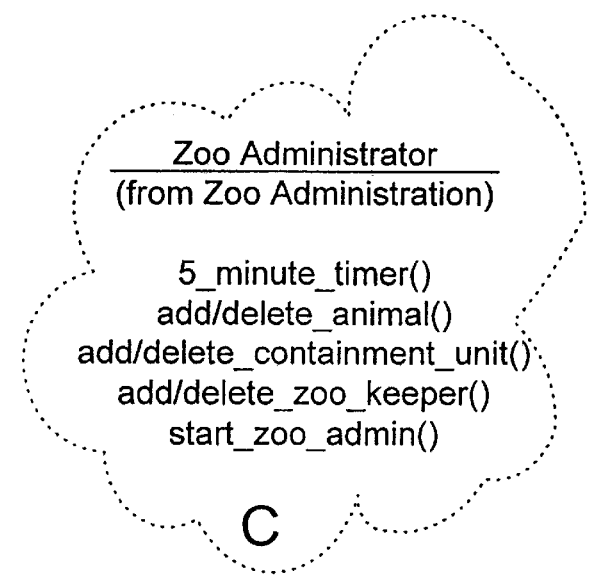

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start___admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
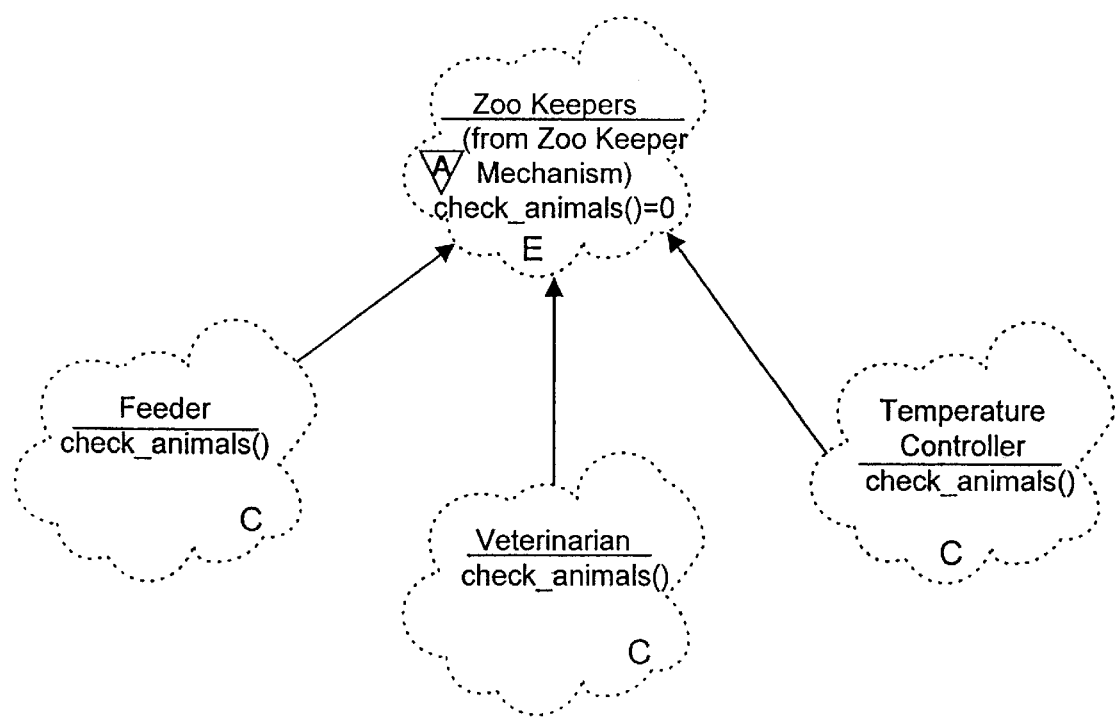

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
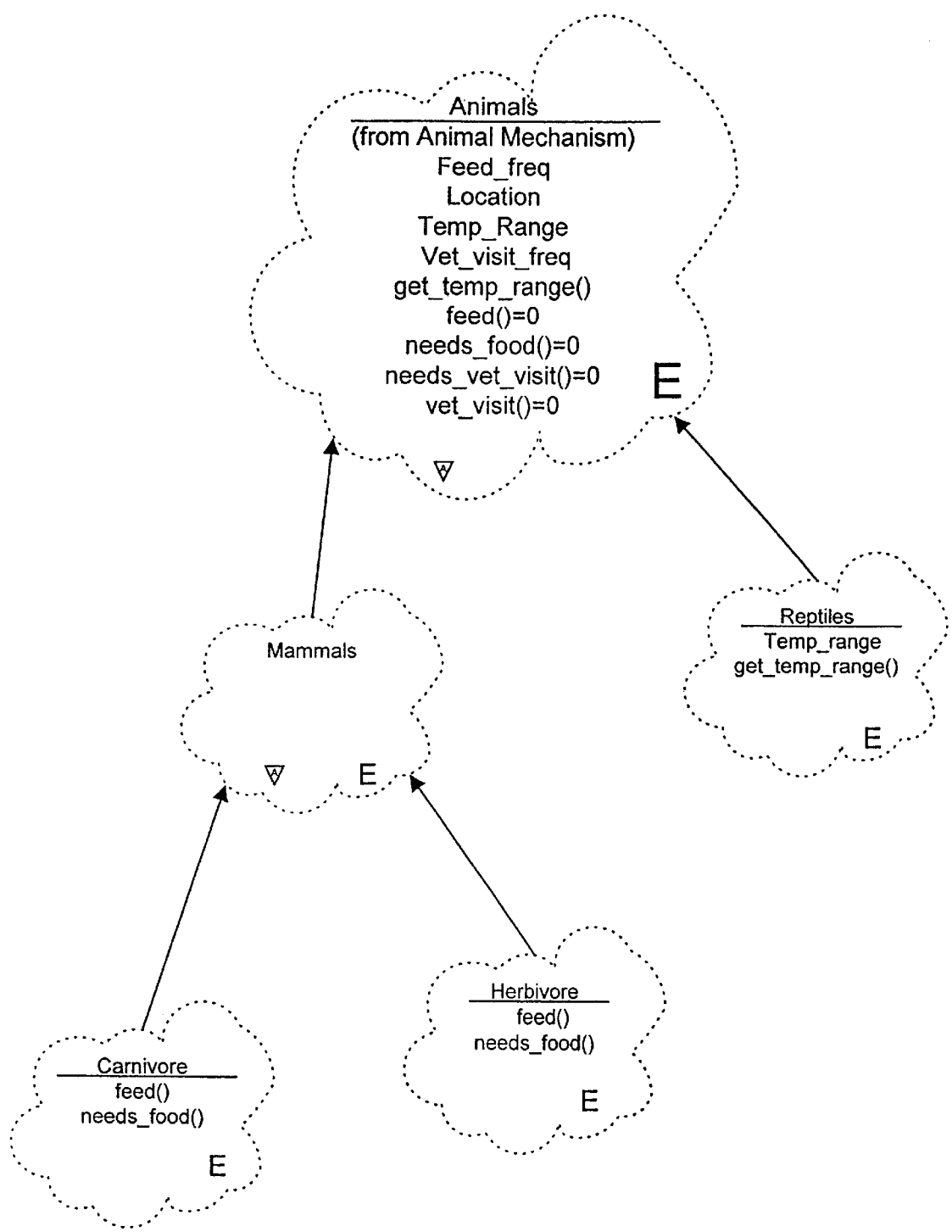

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

Figure 6:
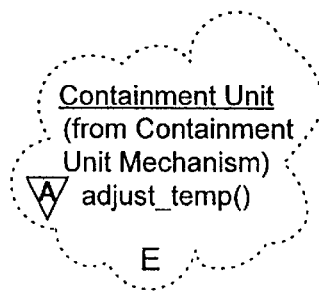

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7:
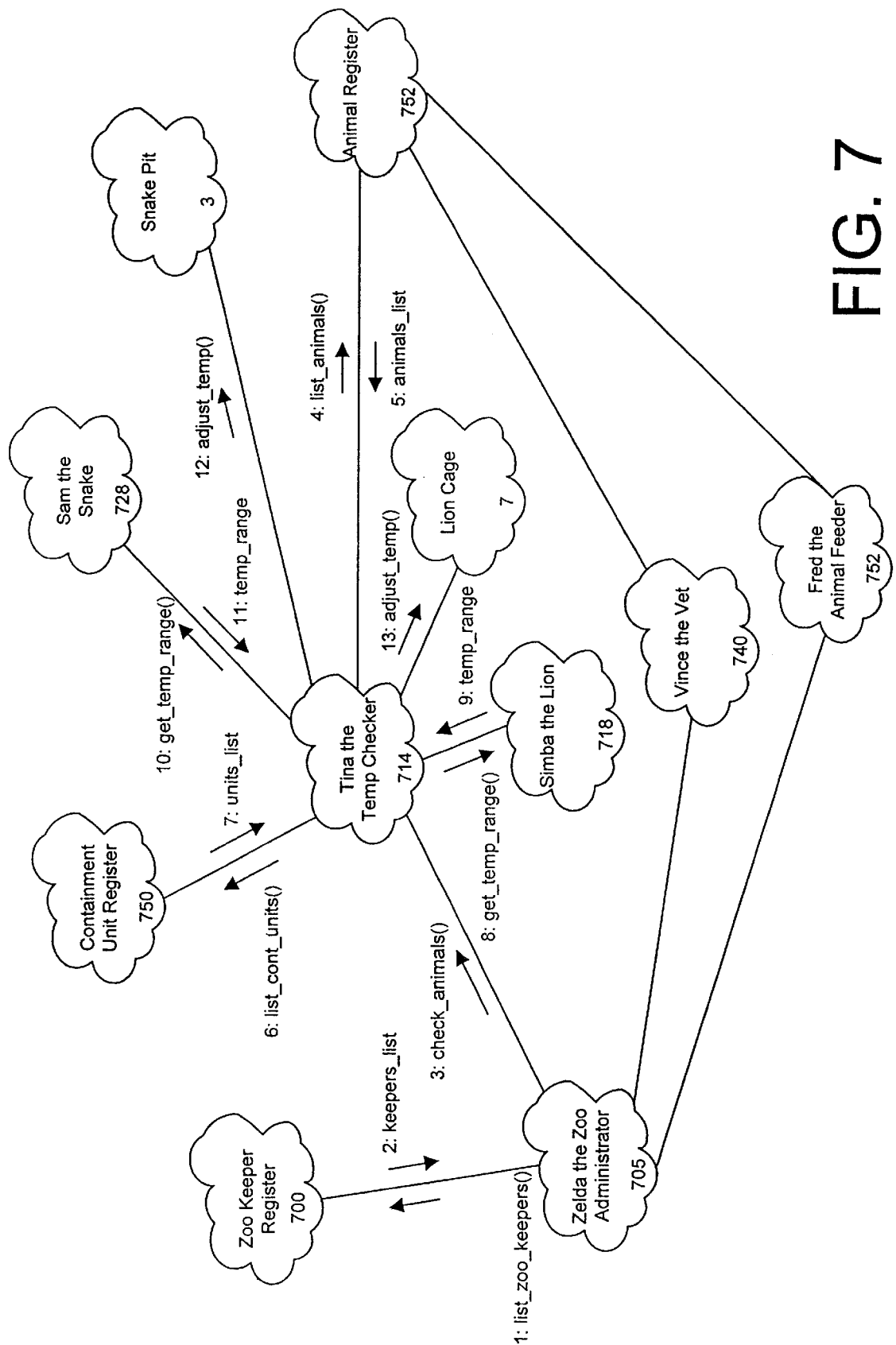
FIG. 7 is an object diagram for the example framework mechanism of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get_temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust_temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

DETAILED DESCRIPTION

Figure 8:
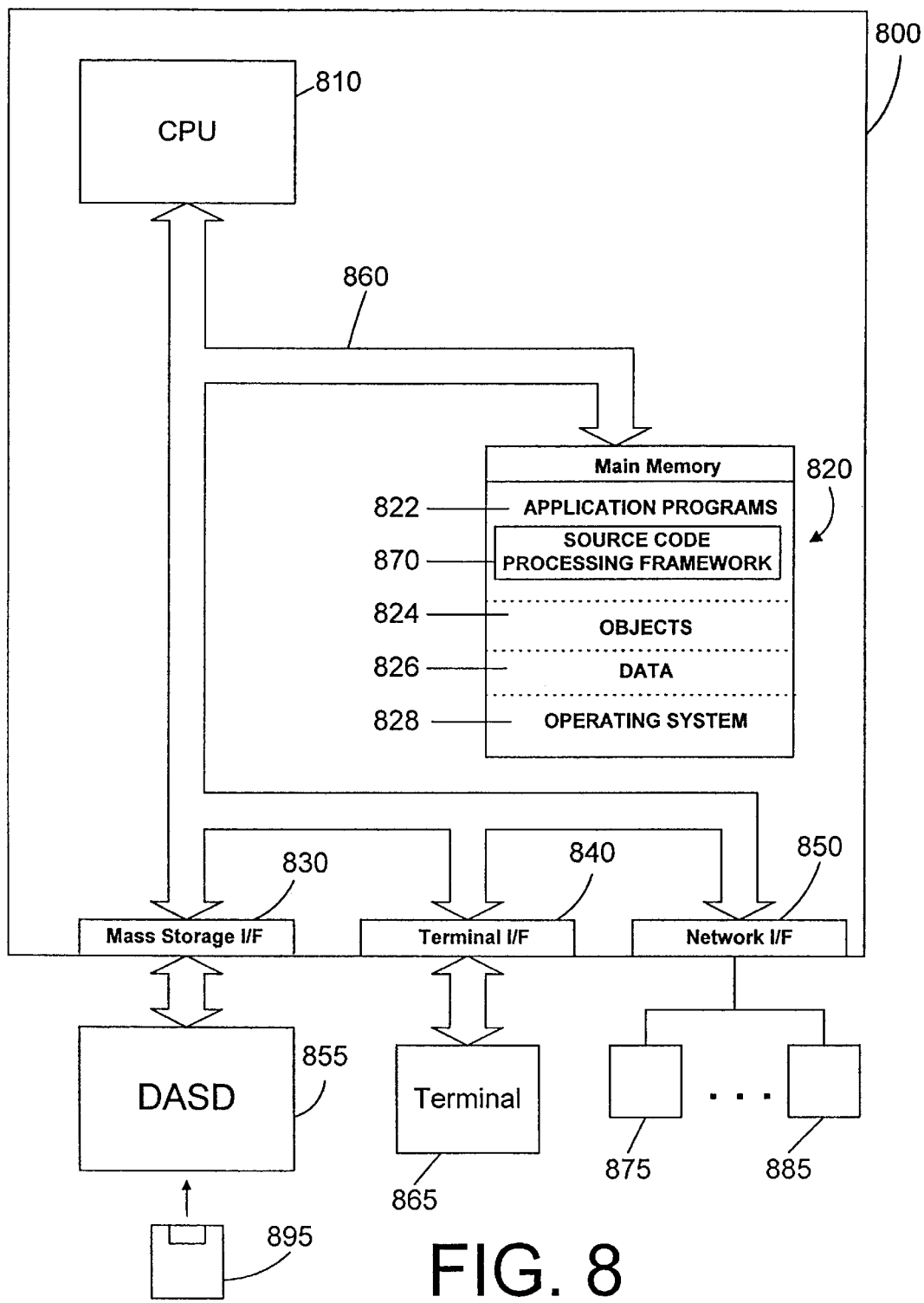
FIG. 8 is a block diagram of the computer system used in the preferred embodiment.

FIG. 8 shows a block diagram of the computer system of the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. (It should also be noted that the term "computer system memory" is used herein to generically refer to the entire virtual memory of computer system 800.)

Operating system 828 is a suitable multitasking operating system such as AIX; however, those skilled in the art will appreciate that the spirit and scope of the present invention is not limited to any one operating system. Operating system 828 preferably supports an object oriented programming environment such as that provided, for example, by the C++ programming language. One or more application programs 822 provide a programming environment for computer system 800, and include a source code processing framework mechanism 870, which is preferably an object oriented framework mechanism. However, the scope of the invention is not limited to object oriented framework mechanisms within application programs, and framework mechanism 870 (whether object oriented or not) may exist anywhere in the virtual memory space of computer 800.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more programs of application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product via floppy disk (e.g., 895 of FIG. 8), CD ROM, or other form of recordable media, or via any type of electronic transmission mechanism.

Source Code Processing Framework Mechanism of the Present Invention

The source code processing framework mechanism disclosed herein provides an architecture for defining a very powerful yet flexible programming environment for computer programmers. This programming environment may be easily extended to accommodate any number of platforms by implementing the native processing functions provided by the platform into the framework, and by defining a processing configuration that includes the new platform. There are four different functions that are performed by some platform during the processing of source code, namely: development, target, library, and processing. A development platform is the platform on which the source code is written or originally developed. A target platform is the platform on which an executable derivative of the source code is intended to run. A library platform is a platform on which the source code is stored. A processing platform is a platform on which the source code processing (e.g., compilation) is performed. Each of these functions may be accomplished by one platform, or may be accomplished by any combination of multiple platforms. For example, it is possible for a software developer to develop source code on one platform P1 targeted for a different platform P2, store the code in a third (library) platform P3, and process the source code on a fourth platform P4. It is important to remember that the term platform refers to a type of computer, and not a specific computer. While a software developer may write source code on a first computer, store the source code on a second computer, and compile the source code on a third computer, if these three computers are of the same type, this is still development on a single platform, and the programmer would be able to use the same processing tools on all these machines. The benefit of the framework disclosed herein is the capability to use processing tools from one particular platform when multiple platforms are involved.

Once different platforms are defined within the framework, source code processing may be performed across platforms by extending extensible functions within the framework to implement a specific processing configuration. Any number of processing configurations may be defined and implemented with the framework. Source code processing as used herein is a generic term for any type of processing on source code. Well-known processing steps for source code include compilation and linking. The term source code processing is intended in its broadest sense, including any particular step or combination of steps that process source code.

Figure 9:
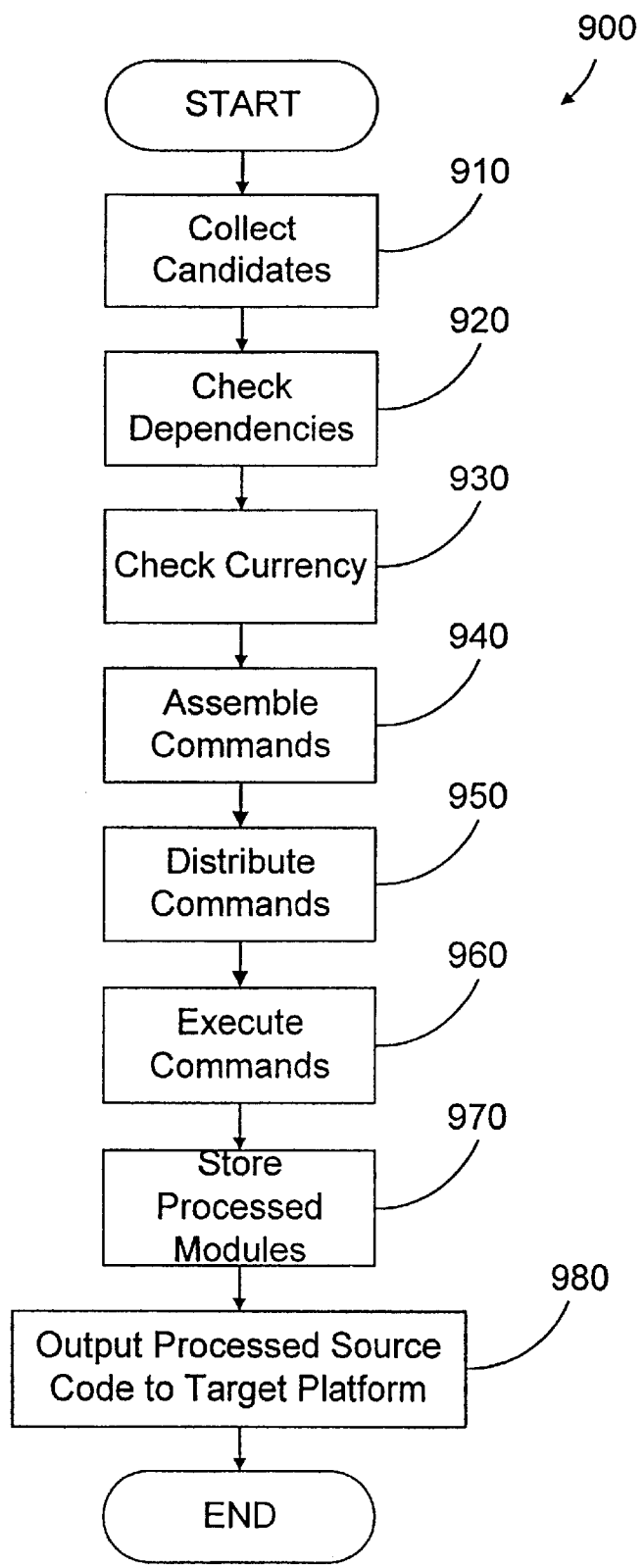
FIG. 9 is a flow diagram showing steps in accordance with the present invention to perform core functions of the framework mechanism.

Referring to FIG. 9, a framework in accordance with the present invention performs step that comprise a method 900. The first step is to collect the initial candidates for processing (step 910). The initial candidates are the parts (e.g., source code modules) that the user specifies for processing. Next, the dependencies of the initial candidates to other modules is determined (step 920). Dependencies are modules that an initial candidate uses directly or indirectly. The currency of the initial candidates and dependencies is then checked (step 930) to determine which modules must be processed. The appropriate commands for the processing tool are then generated (step 940) to process all required modules. These commands are then distributed (step 950) to a number of different computers on a network (if available). In the preferred embodiment, a network of computer systems is available over which the commands (e.g., in step 940) may be distributed (e.g., in step 950). If the framework is used on a stand-alone computer system, the distribute step 950 will not be able to distribute the commands to other computers, and the stand-alone computer will process all commands. The framework user would still implement a distributor subclass, but this subclass would provide a null function. In the alternative, a framework within the scope of the present invention could forego the distribute step 950 and process all of the commands on the computer executing the framework. The distribute step 950 of FIG. 9 is illustrated as one step in the preferred embodiment of the invention. The commands are then executed by the one or more computers (step 960), processing the modules. The processed modules are then stored (step 970), and the processed code is output to a target platform (step 980). While the specific implementation of each step of method 900 will vary according to the desired processing configuration and the specific extensible functions provided by the framework user, method 900 is an illustration of several processing steps that may be performed for a large number of different configurations implemented within a single framework.

The fact that the preferred embodiment of the framework is object oriented, while not essential to the broad concept of the invention, allows the user of the framework to easily define the needed functions by subclassing from the classes defined within the framework using known object oriented programming environments, such as C++. The preferred embodiment of the present invention is an object oriented source code processing framework. While many different designs and implementations are possible, one suitable example of an object oriented source code processing framework is disclosed below to illustrate the broad concepts of the present invention.

Class Definitions

Figure 10:
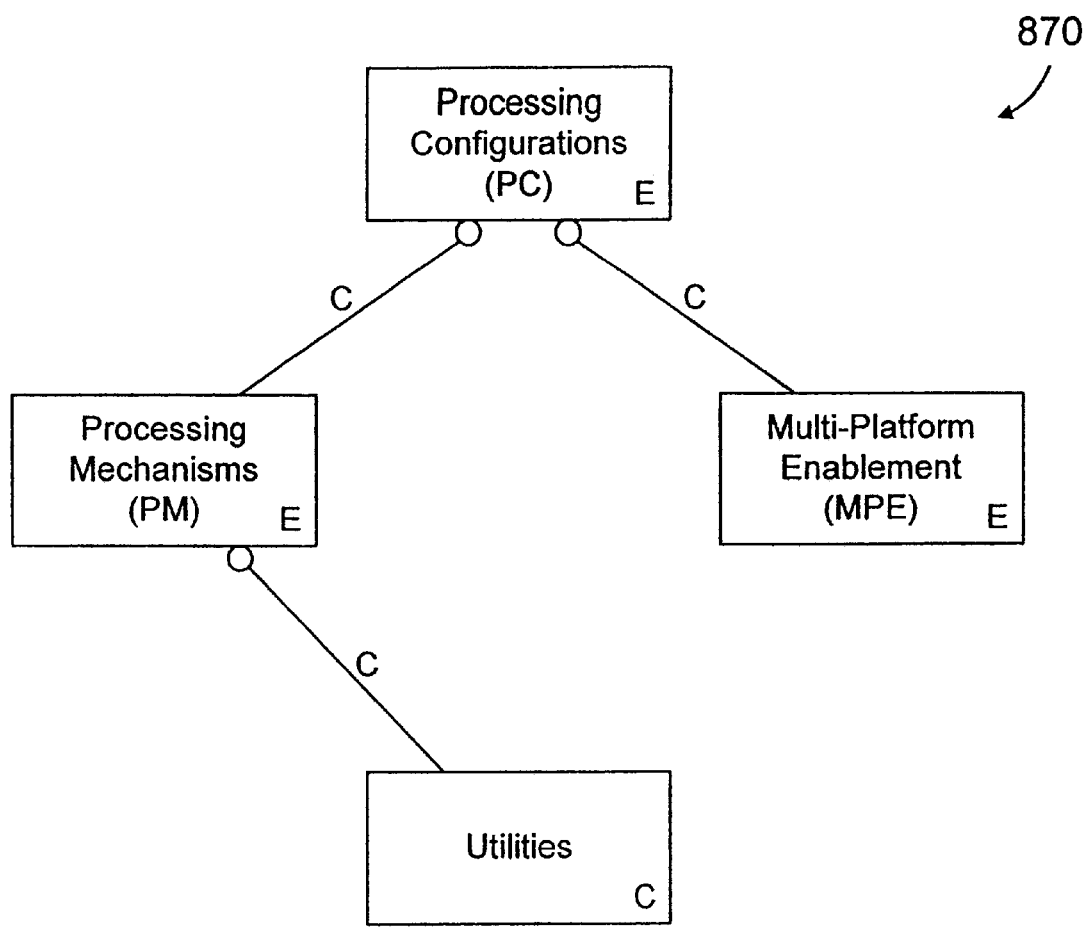
FIG. 10 is a category diagram of a framework mechanism constructed in accordance with the teachings of the present invention.

FIG. 10 is a category diagram of the source code processing framework mechanism 870 in accordance with the present invention. Those skilled in the art will appreciate that the categories illustrated in FIG. 10 represent collections of object oriented programming (OOP) classes that encapsulate data attributes and behaviors (or methods). Objects instantiated as members of these classes are stored in the main memory 820 of computer system 800. These classes may be implemented, for example, in a computer system operating environment that supports the C++ programming language.

The classes have been broken down into four categories: the Processing Configurations (PC) category, the Processing Mechanisms (PM) category, the Multi-Platform Enablement (MPE) category, and the Utilities category. The Utilities category is a core category (as indicated by the "C" label), meaning that the classes in the utilities category may not be modified by a user of framework 870. The remaining categories are extensible categories (as indicated by the "E" label), meaning that users may extend the classes in these categories by defining and implementing classes that are subclasses of framework-defined classes. The Processing Configurations category has a using relationship with the Processing Mechanisms category and the Multi-Platform Enablement category, indicating that classes within the Processing Configurations category invoke the methods provided by the classes in these categories. In addition, the Processing Mechanisms category has a using relationship with the Utilities category. Note that these relationships between categories are core relationships (as indicated by the "C" label), meaning that the framework user cannot modify these relationships.

Figure 11:
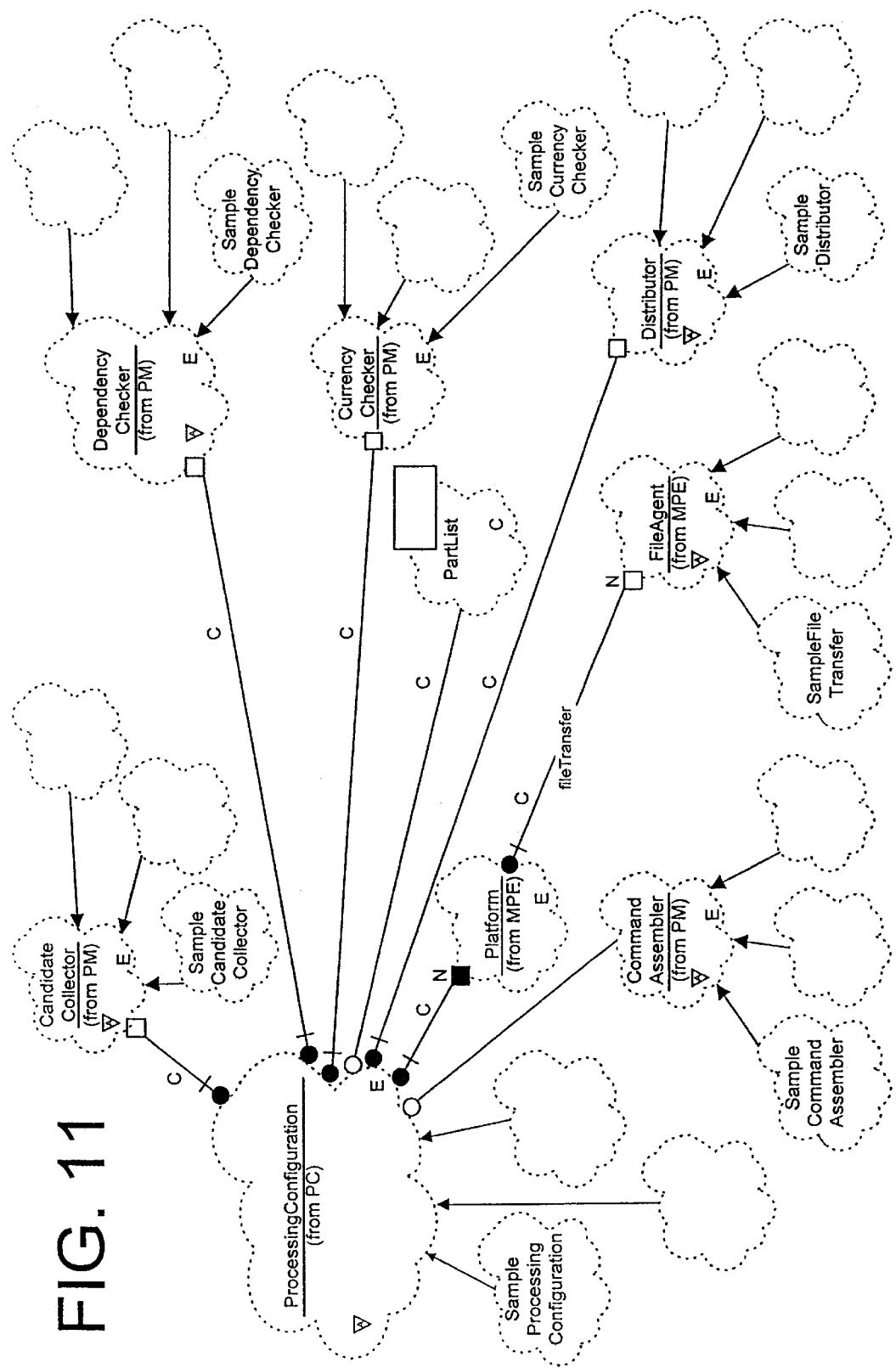
FIGS. 11–15 are class diagrams of a framework mechanism constructed in accordance with the teachings of the present invention.

FIG. 11 is a top level class diagram of the classes used to implement source code processing framework 870. The categories to which the classes belong are identified by the abbreviations below the class names, with a PC indicating that the class belongs to the Processing Configurations category, a PM indicating that the class belongs to the Processing Mechanisms category, and a MPE indicating that the class belongs to the Multi-Platform Enablement category. The ProcessingConfiguration class belongs to the Processing Configurations category. Members of the Processing Mechanisms category include: CandidateCollector, DependencyChecker, CurrencyChecker, Distributor, and CommandAssembler. Members of the Multi-Platform Enablement category include: Platform and FileAgent. The key methods provided in each class are not shown in FIG. 11, but are shown in subsequent figures.

The framework of FIG. 11 may be used by subclassing from the extensible classes (marked with an E). Thus, a user of the framework may extend the framework by defining a subclass, for example SampleProcessingConfiguration, then by supplying subclasses such as SampleCandidateCollector, SampleDependencyChecker, SampleCurrencyChecker, SampleDistributor, SampleFileTransfer, and SampleCommandAssembler that support the SampleProcessingConfiguration. The unmarked classes of FIG. 11 illustrate that many different subclasses could be defined to support a large number of processing configurations.

Figure 12:
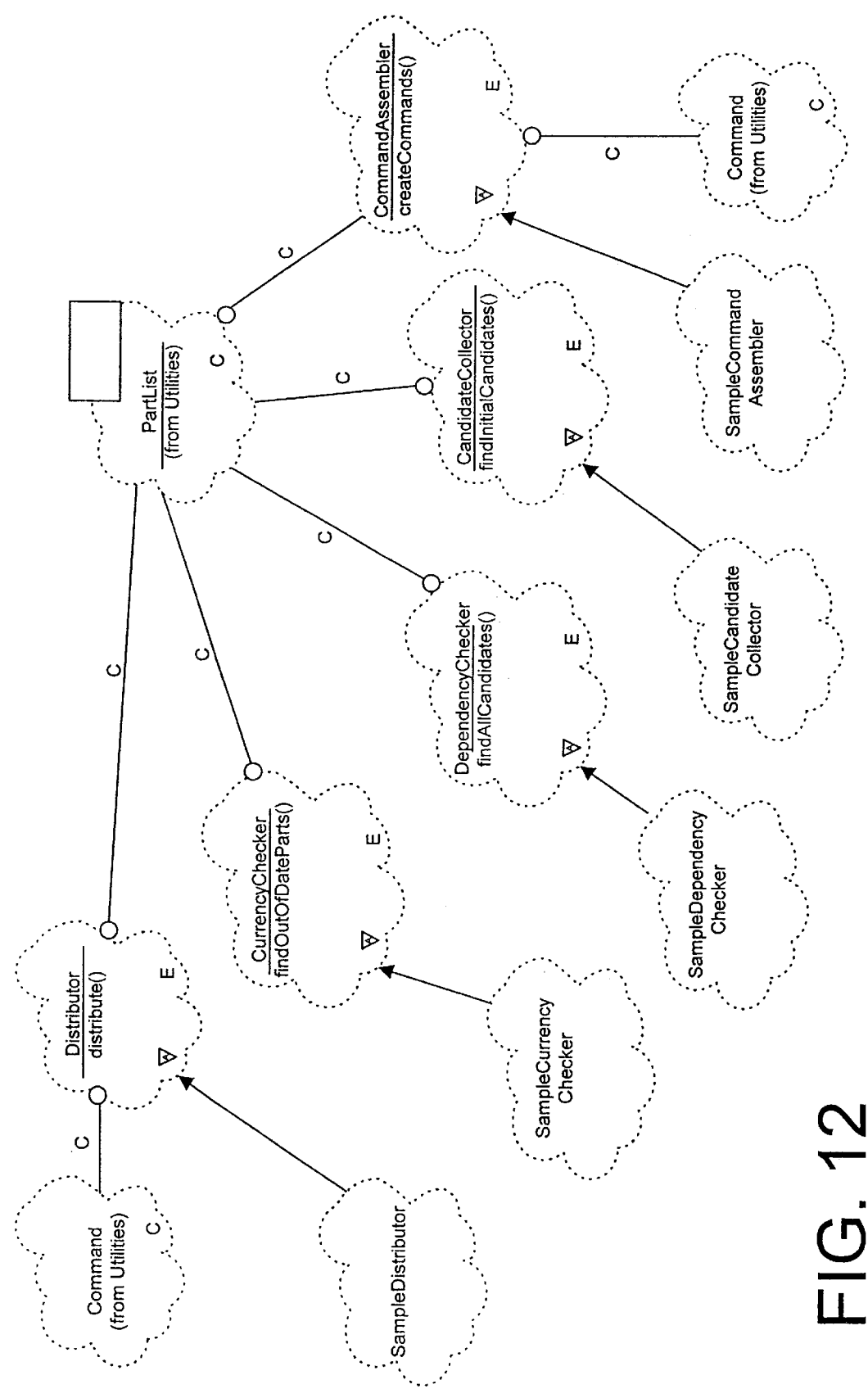

A class diagram of the classes in the Processing Mechanisms category is shown in FIG. 12. (Note that Command is actually in the Utilities category, but is shown here to allow a description of the behavior of the classes in the Processing Mechanisms category that use Command.) The Distributor class, the CurrencyChecker class, the DependencyChecker class, the CandidateCollector class, and the CommandAssembler class are all extensible abstract classes, and they all have a using relationship with the PartList parameterized core class. The relationships between these classes are core relationships, those that may not be changed by the user of the framework. The Command class is a core class that is part of the Utilities category, and the Distributor and CommandAssembler both have a using relationship with Command.

As described with reference to FIG. 11, a user of the framework may extend the framework by subclassing from the extensible classes. Thus, for the classes in the Processing Mechanisms category of FIG. 12, the following user-defined subclasses are provided as examples: SampleDistributor, SampleCurrencyChecker, SampleDependencyChecker, SampleCandidateCollector, and SampleCommandAssembler. The classes of CandidateCollector, DependencyChecker, CurrencyChecker, and CommandAssembler represent functions that all source code processors must perform. In general, any source code processor will first determine what modules have been targeted for processing, and will collect the candidates in an initial list. This function corresponds to the CandidateCollector class. Next, the initial list is checked to determine dependencies by other modules on the modules in the initial list, and a dependency list is created that contains both the candidates and their dependencies. This function corresponds to the DependencyChecker class. All the modules in the dependency list are then checked to see if they have changed since the last processing (e.g., compilation). Of those modules in the dependency list, those that require processing are put in an out of date list. This function corresponds to the CurrencyChecker class. Next, commands with all the appropriate options are generated to cause each of the modules in the out of date list to be processed. This function corresponds to the CommandAssembler class.

Each different type of platform that provides a stand-alone programming environment will typically have native commands for native tools that process source code. These native tools may be implemented in the framework by subclassing from the extensible classes listed above. In this manner, any number of platforms and their respective native processing tools may be supported by the framework, allowing a programmer to use tools native to one platform when working on a different platform. In addition to the power and flexibility that the framework provides to support any processing tool from any platform, the framework also allows a user to use the native tools when detached from their programming environment. The framework essentially emulates the operation of a particular native processing tool by implementing its various sub-functions using the native functions of other platforms. This allows a programmer to bypass the framework and use the same native commands when detached from the programming environment that the framework provides.

Each extensible class in FIG. 12 defines a set of methods which provide the functions needed for the framework to operate. The Distributor class defines extensible method distribute( ). CurrencyChecker defines extensible method findOutOfDateParts( ), DependencyChecker defines extensible method findAllCandidates( ); CandidateCollector defines extensible method findlnitialcandidates( ); and CommandAssembler defines extensible method createCommands( ). Each of these methods correspond to functions that may be performed during source code processing.

These methods provide extensible interfaces that allow a user of the framework to take advantage of the flexibility and power of the framework by easily adapting the framework to new or different platforms or processing tools. The specific implementation shown in the figures for the classes are shown for the purpose of illustration, and a framework user may select alternative implementations by overriding extensible methods within the scope of the present invention.

Figure 13:
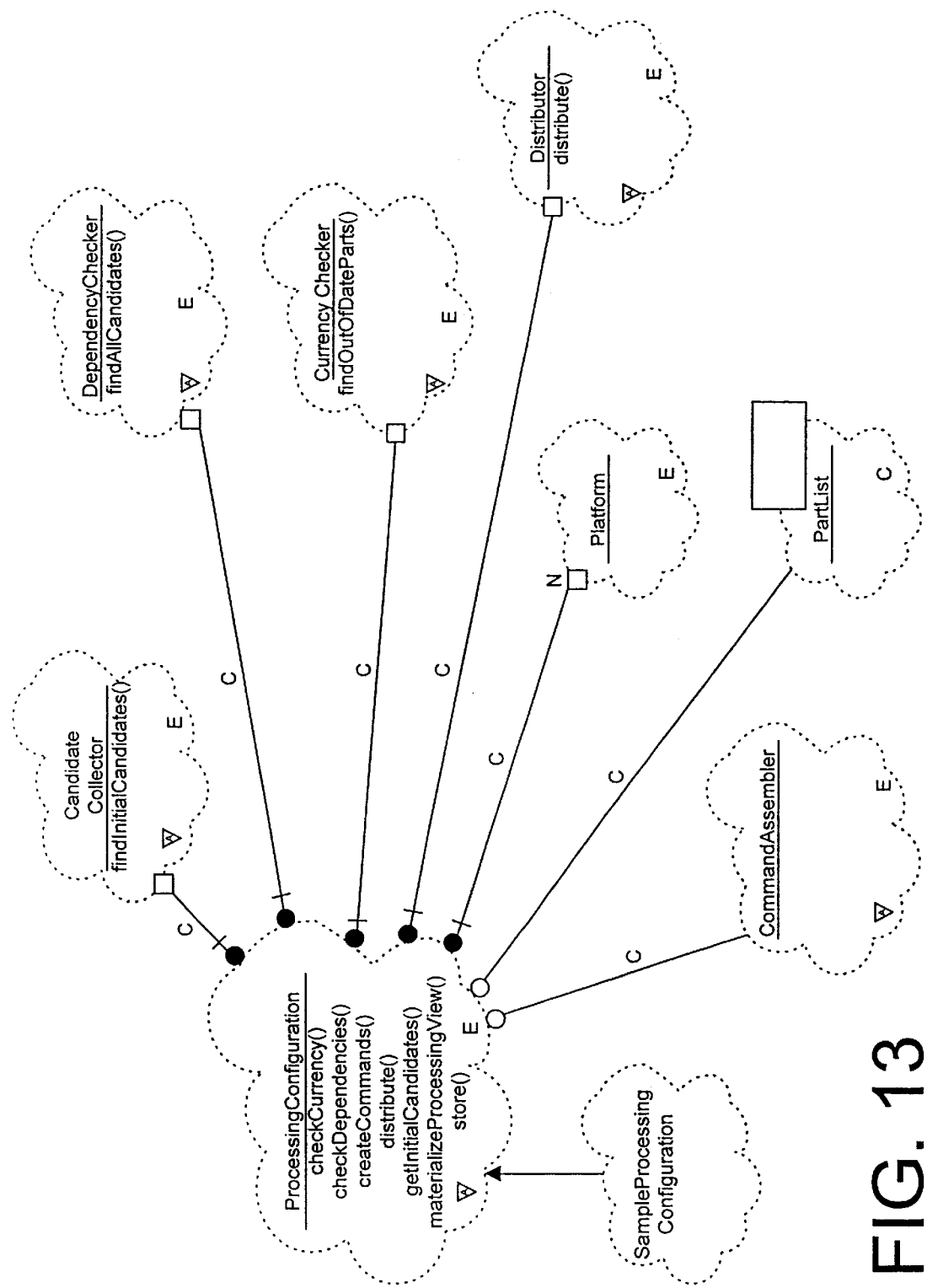

FIG. 13 illustrates the relationships of the ProcessingConfiguration class to other classes in the framework. ProcessingConfiguration is an extensible class that contains the methods shown. ProcessingConfiguration is the class that a user of the framework will use to define a specific programming environment that needs to be supported by the framework. ProcessingConfiguration has a "has by reference" relationship to CandidateCollector, DependencyChecker, CurrencyChecker, Distributor, and Platform, indicating that a ProcessingConfiguration will include one or more objects from each of these classes. ProcessingConfiguration has a using relationship with the PartList parameterized core class and the CommandAssembler extensible class. All of the relationships between classes in FIG. 13 are core relationships, that a user of the framework may not alter. SampleProcessingConfiguration is an example of a user-defined processing configuration that is defined by subclassing from the ProcessingConfiguration extensible class.

An object instantiated under the ProcessingConfiguration class will have the methods shown in FIG. 13. Many of the methods simply call methods in the other extensible classes. For example, when the getInitialCandidates( ) method of ProcessingConfiguration is invoked, it in turn invokes the findInitialCandidates( ) method of CandidateCollector. When the checkCurrency( ) method of ProcessingConfiguration is invoked, it in turn invokes the findOutOfDateParts( ) method of the corresponding CurrencyChecker. In similar fashion, when the checkdependencies( ) method of ProcessingConfiguration is invoked, it in turn invokes the findAllCandidates( ) method of the corresponding DependencyChecker. When the distribute( ) method of ProcessingConfiguration is invoked, it in turn invokes the distribute( ) method of the Distributor. And when the createCommands( ) method of ProcessingConfiguration is invoked, it in turn invokes the createCommands( ) method of the CommandAssembler.

Figure 14:
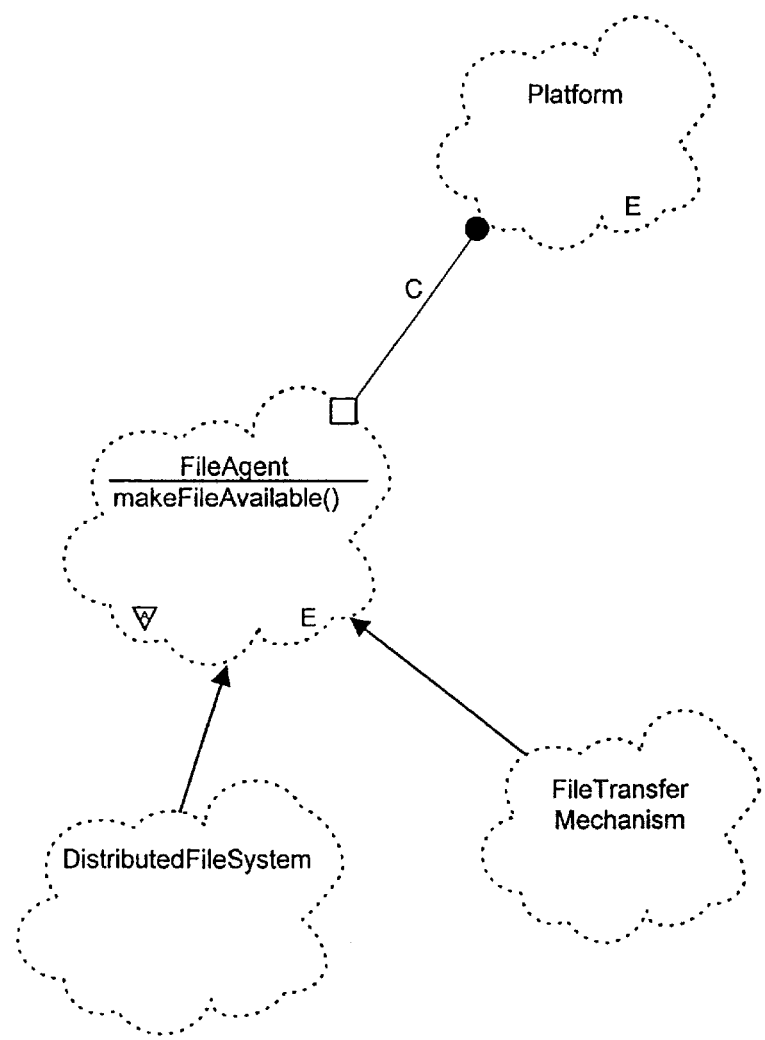

Classes included in the Multi-Platform Enablement category are illustrated in FIG. 14. A Platform class is defined that is an extensible class of the framework. The platform class has a "has by reference" relationship to a FileAgent class, which is an abstract extensible class of the framework. The relationship between the Platform class and the FileAgent class is a core relationship. The classes DistributedFileSystem and FileTransferMechanism are shown as examples of user-extended classes that are defined by subclassing from the FileAgent abstract class.

Figure 15:
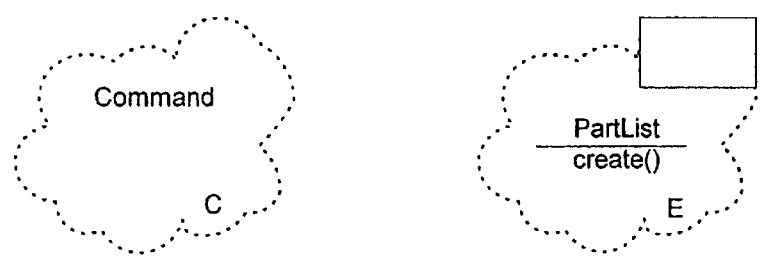

The Utilities category includes a Command class and a PartList class, as shown in FIG. 15. Command and PartList are both core classes. Command contains a processing command (such as a compile command) and a create( ) method to create the processing command. PartList also includes a create( ) method, which is invoked when a part list needs to be created.

Core Functions

FIG. 11 best distinguishes between core and extensible functions in the diagnostic framework of the present invention. Specifically, as noted above, the PartList class is the only core class. The rest of the classes in FIG. 11 are extensible. Note that all class relationships shown in FIG. 11 are core relationships, and may not be modified by the user of the framework. In fact, it is the fixed character of these relationships between classes that characterizes a framework and makes it useful and powerful. The core function of the source code processing framework is defined by the one core class and class relationships, along with functional requirements that cause the framework to behave in the desired manner. As described above with respect to FIG. 9, the overall core function of the diagnostic framework includes the steps of method 900.

Object Interaction

Figure 16:
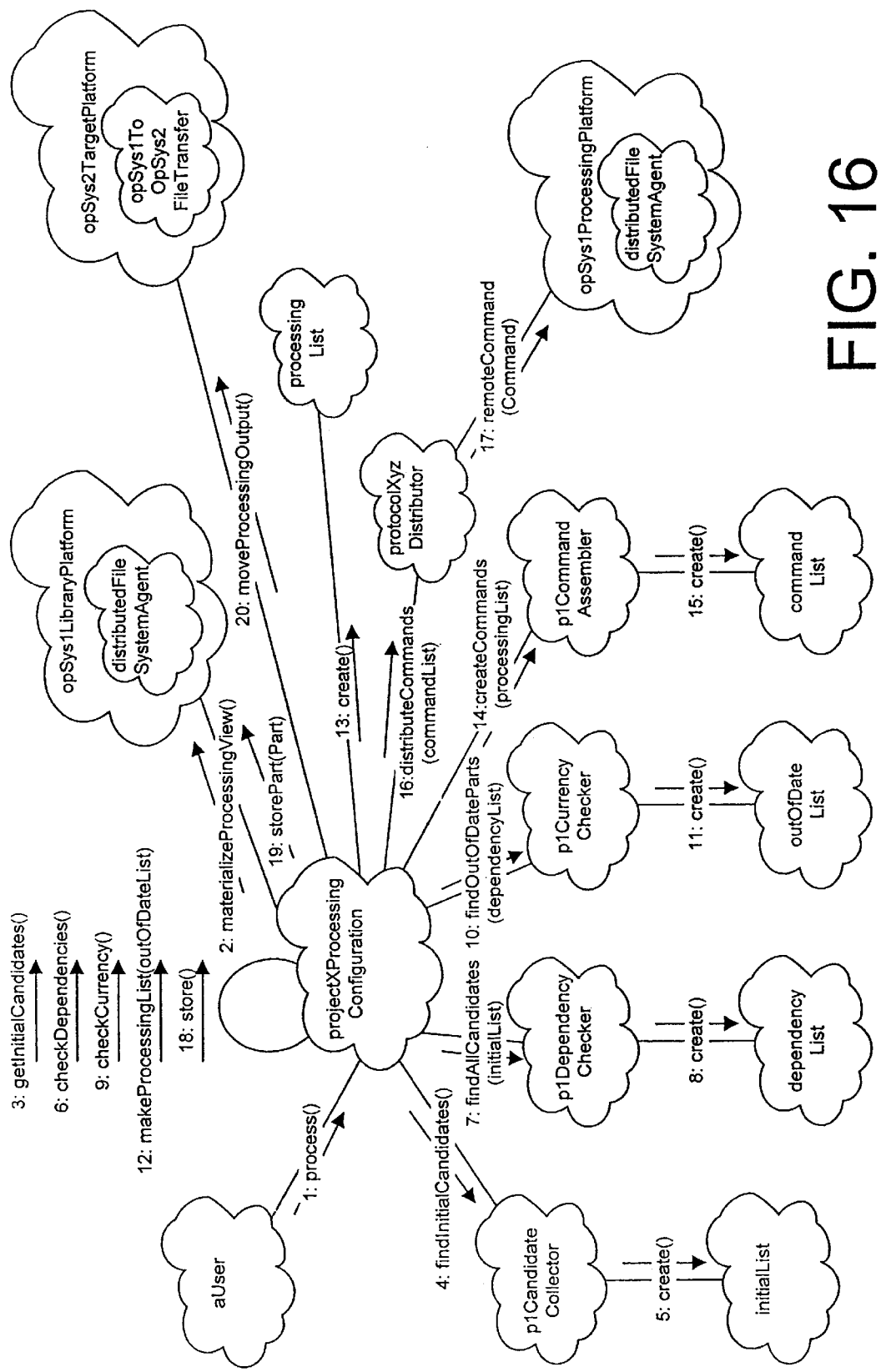
FIGS. 16–19 are object diagrams of a framework mechanism constructed in accordance with the teachings of the present invention to implement two different processing configurations.
Figure 17:
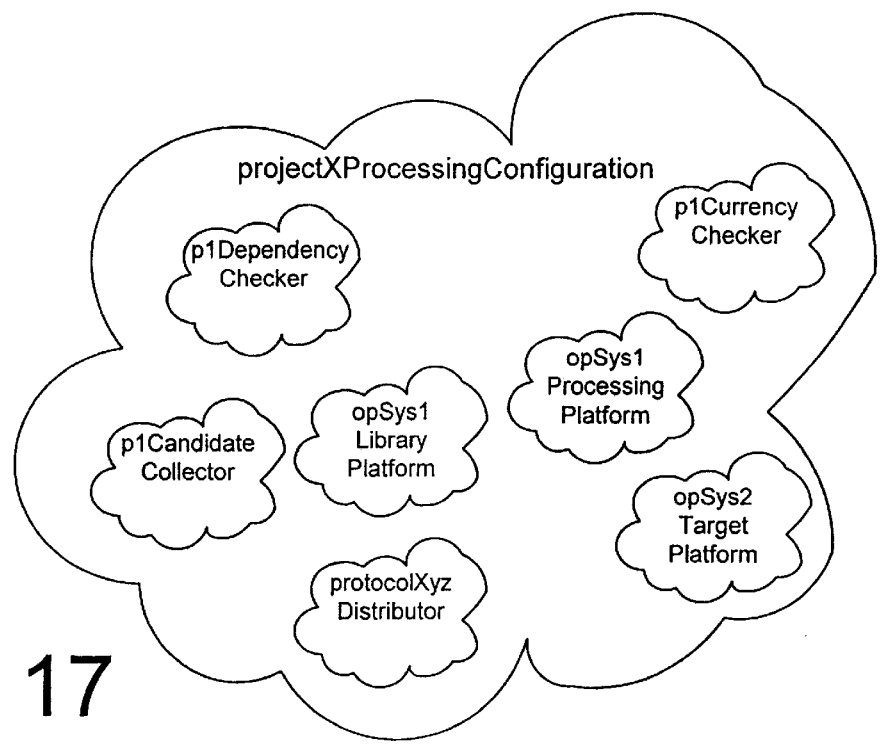
Figure 18:
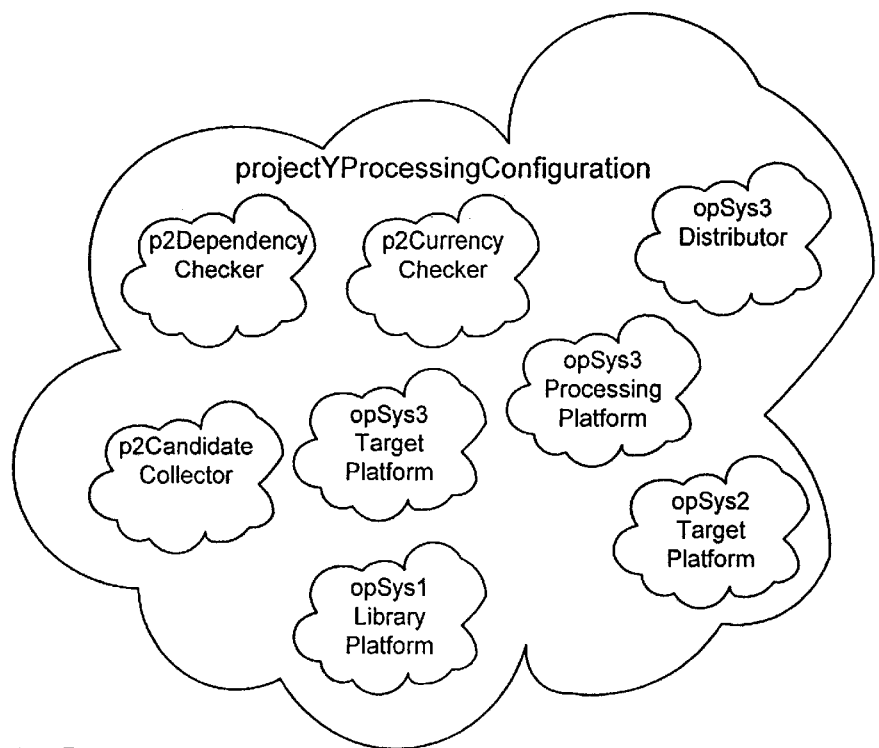
Figure 19:
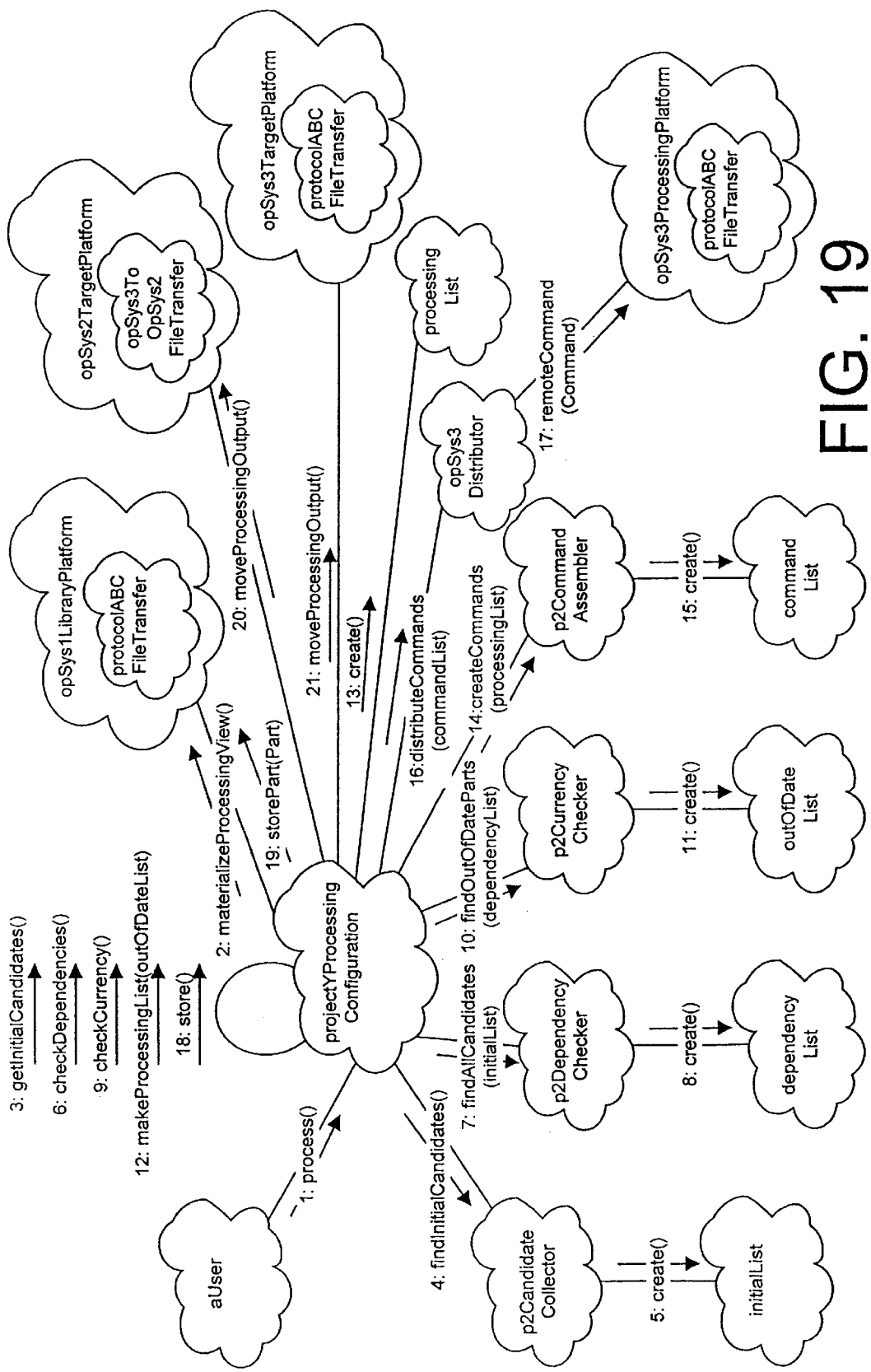

The operation of the framework of FIG. 11 may be best understood by providing two specific processing configurations as examples. FIGS. 16 and 17 illustrate a first example of a processing configuration, and FIGS. 18 and 19 illustrate a second example of a different processing configuration. A processing configuration generally contains a specification of the following parameters: development platform, library platform, processing platform, target platform, whether or not a distributed file system or some type of file transfer is available, whether of not a facility exists for distributing commands across a network, and the processing tool to be used. The first example, as illustrated in FIGS. 16 and 17, is referred to herein as the projectXProcessingConfiguration, which is specified as follows:

1) The end user is running on OpSys1 (Development platform=OpSys1)
2) The library is running on OpSys1 (Library platform=OpSys1)
3) The source will be processed on OpSys1 machines (Processing platform=OpSys1)
4) The source code is processed to execute on OpSys2 machines (Target platform=OpSys2)
5) A distributed file system is available for a network of OpSys1 machines
6) A distribution mechanism (protocolXYZDistributor) is available on multiple operating systems including OpSys1
7) The processing tool chosen on OpSys1 is P1

Figure 20:
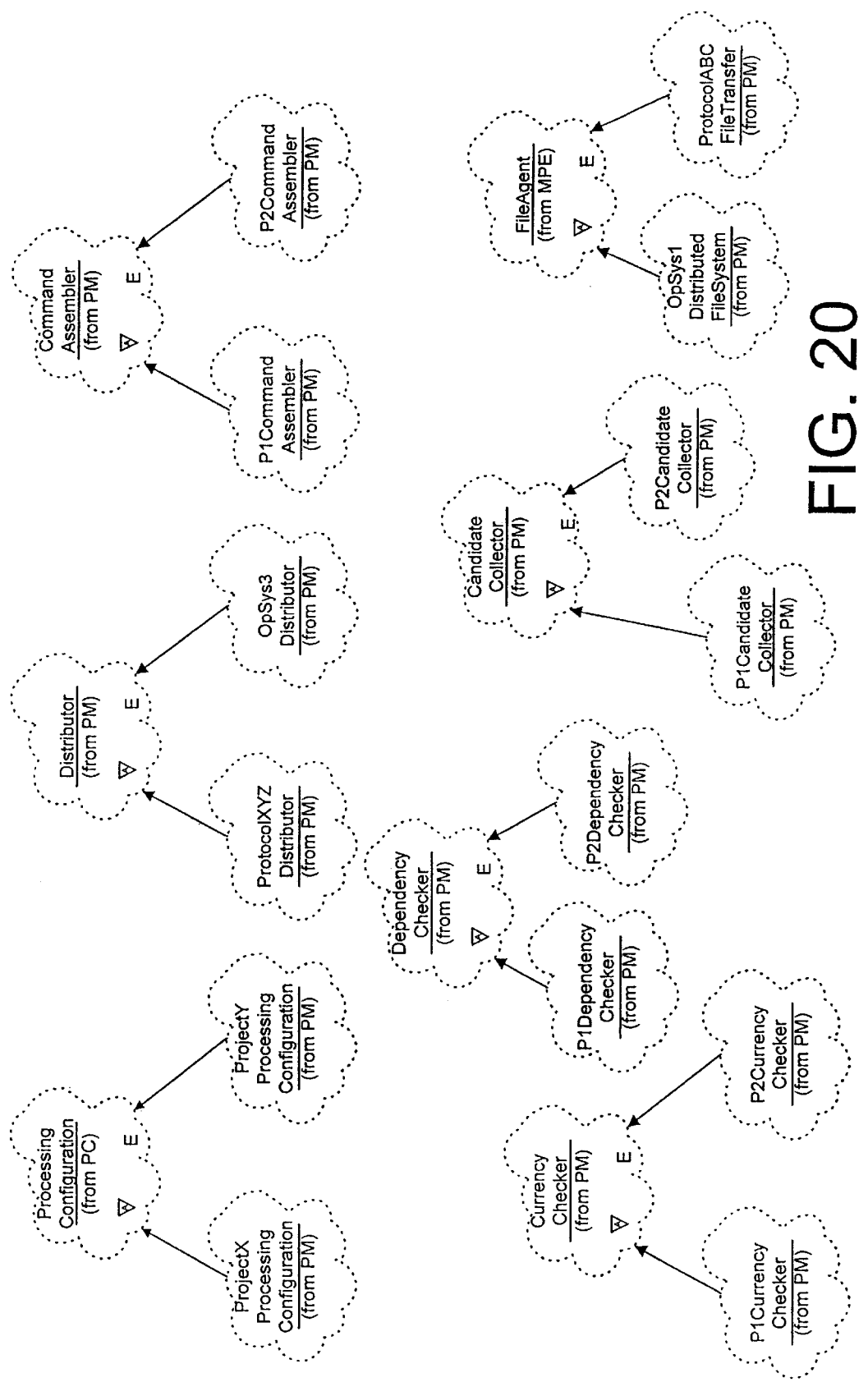
FIG. 20 is a class diagram showing the extension of the framework to implement the processing configurations of FIGS. 16–19.

Referring to FIGS. 16 and 17, the object diagrams for the projectXProcessingConfiguration are shown. Each of the objects shown correspond to classes defined and discussed above, as illustrated by the concrete subclasses shown in FIG. 20. The implementation of FIG. 20 illustrates how a user of the framework can extend the classes of the framework to accommodate any suitable processing configuration by providing concrete subclasses of the extensible framework classes. For example, p1DependencyChecker corresponds to an object that is a member of a P1DependencyChecker class; p1CandidateCollector corresponds to an object that is a member of a P1CandidateCollector class; opSys1LibraryPlatform corresponds to an object that is a member of the Platform class (not shown); protocolXYZDistributor corresponds to an object that is a member of a ProtocolXYZDistributor class; p1CurrencyChecker corresponds to an object that is a member of a P1CurrencyChecker class; opSys1ProcessingPlatform corresponds to an object that is a member of the Platform class (not shown); and opSys2TargetPlatform corresponds to an object that is a member of a concrete subclass of the Platform class (not shown). The object projectXProcessingConfiguration includes each of these objects described above, as illustrated in FIG. 17.

Referring now to FIG. 16, an object aUser represents a user of a development environment that leverages the framework, and the processor ( ) method initiates action by the framework (step 1). The aUser object is a simplified representation of any user interface that initiates processing of source code, and may be implemented by any suitable fashion. Next the method materializeProcessingView( ) is invoked (step 2) to assure the files needed to process the source code are available. The object opSys1 LibraryPlatform includes an object distributedFileSystemAgent, which is a member of a concrete subclass of the FileAgent class. This configuration assumes that opSys1 supports distributed file storage, and the distributedFileSystemAgent is responsible for materializing the processing view, i.e., to make the required files available to the framework. The getInitialcandidates( ) method is then invoked (step 3), which results in the projectXProcessingConfiguration object delegating that function by calling the findInitialCandidates( ) method (step 4) of p1CandidateCollector. p1CandidateCollector is an object that performs the candidate collection function for the native p1 processing tool. Likewise, p1DependencyChecker, p1CurrencyChecker, and p1CommandAssembler all correspond to the dependency checker function, the currency checker function, and the command assembler function of the native p1 processing tool. In response to the findInitialCandidates( ) method being called, p1CandidateCollector creates an initialList of candidates (step 5), which is an object that is a member of the PartList class.

Next, the dependencies of the candidates in the initialList are determined by calling the checkDependencies( ) method (step 6). This function is delegated to the p1DependencyChecker object by invoking the findAllCandidates( ) method based on the initialList, which is passed as a parameter (step 7). p1DependencyChecker then determines the dependencies of all the candidates in the initialList, and creates a dependencyList by calling the create( ) method (step 8). The dependencyList is an object that is a member of the PartList class.

Once the dependencyList has been constructed identifying all portions of the program that may need to be processed, the currency of the modules in the dependencyList must be determined by invoking the checkcurrency( ) method (step 9). This function is delegated to the p1CurrencyChecker object by calling its findOutOfDateParts( ) object, passing the dependency list as a parameter (step 10). The currency of each entry in the dependencyList is checked, and from this list an outOfDate list is created by calling its create( ) method from p1CurrencyChecker (step 11). The outOfDate list is a member of the PartList class, and contains a list of items in the dependencyList that are out of date (i.e., that need to be processed).

The next step in the process calls the makeProcessingList( ) method, passing the outOfDateList as a parameter (step 12). The projectXProcessingConfiguration object accomplishes this task by invoking the create( ) method of a processingList object (step 13), which is a member of the PartList class. The processingList object contains the list of modules to be processed, which is derived from combining the initial candidates the user requested to be processed plus those modules that are dependent upon the initial candidates and are not current (from the outOfDateList). Next, the createCommands( ) method of p1CommandAssembler is called, passing the processingList as a parameter (step 14). p1CommandAssembler then calls the create( ) method of commandList (step 15), which creates a list of commands to process the modules in the processingList.

Once the commandList is created, these commands are distributed by calling the distributeCommand( ) method of the protocolXYZDistributor, passing the commandList as a parameter (step 16). The protocolXYZDistributor object represents a distributor that may exist on multiple operating systems, including opSys1. The distributor then calls the remoteCommand( ) method on the opSys1 ProcessingPlatform object (step 17), which causes distribution of the modules to be processed across various machines on the network by the distributedFileSystemAgent within the opSys1ProcessingPlatform object.

Once the processing is complete, the store( ) method of projectXProcessingConfiguration is called to store the results of the processing (step 18). Calling the store( ) method results in calling the storePart( ) method of the opSys1LibraryPlatform object for as many parts as were processed, passing one part during each call (step 19). Once all parts have been stored back in the library, projectXProcessingConfiguration calls the moveProcessingOutput( ) method on the opSys2TargetPlatform object (step 20). This step moves the processed code to the target platform for execution. Note that this function is performed by the opSys1ToOpSys2FileTransfer object within the opSys2TargetPlatform object. One example of a suitable file transfer mechanism is using File Transfer Protocol (FTP), which is a known file transfer utility that many commercial operating systems support.

A second example processing configuration is described in FIGS. 18 and 19, and is called projectYProcessingConfiguration. The characteristics of the projectYProcessingConfiguration are:
1) The end user is running on OpSys3 (Development platform=OpSys3)
2) The library is running on OpSys1 (Library platform=OpSys1)
3) The source will be processed on OpSys3 machines (Processing platform=OpSys3)
4) The source code is processed to execute on OpSys2 and OpSys3 machines (Target platform=OpSys2 and OpSys3)
5) A protocol for file transfer exists between multiple operating systems including OpSys1 and opSys3 (protocolABCFileTransfer)
6) A distribution mechanism (opSys3Distributor) is available for OpSys3
7) The processing tool chosen on OpSys3 is P2

Referring to FIGS. 18 and 19, the object diagrams for the projectYProcessingConfiguration are shown. Each of the objects shown correspond to classes defined and discussed above, as illustrated by the concrete subclasses shown in FIG. 20. The object projectYProcessingConfiguration includes each of the objects described above, as illustrated in FIG. 18.

Steps 1–15 in FIG. 19 are the same as in the previous discussion relating to the projectXProcessingConfiguration illustrated in FIGS. 16 and 17, with the exception that the projectXProcessingConfiguration is replaced with the projectYProcessingConfiguration, and p1CandidateCollector, p1DependencyChecker, p1CurrencyChecker, p1CommandAssembler, and the objects from concrete subclasses of the FileAgent class (the objects within the platform objects) are all replaced with their corresponding counterparts from p2, as illustrated in FIG. 19. Step 15 results in the creation of a commandList that contains the commands needed to process the modules in the processingList.

Once the commandList is created (step 15), these commands are distributed by calling the distributeCommand( ) method of the opSys3Distributor, passing the commandList as a parameter (step 16). The opSys3Distributor object represents a distributor for opSys3. The distributor then calls the remoteCommand( ) method on the opSys3ProcessingPlatform object (step 17), which causes distribution of the modules to be processed across various machines on the network by the protocolABCFileTransfer object.

Once the processing is complete, the store( ) method of projectYProcessingConfiguration is called to store the results of the processing (step 18). Calling the store( ) method results in calling the storepart( ) method of the opSys1LibraryPlatform object for as many parts as were processed, passing one part during each call (step 19). Once all parts have been stored back in the library, projectYProcessingConfiguration calls the moveProcessingOutput( ) method on the opSys2TargetPlatform object (step 20). This step moves the processed code to the opSys2TargetPlatform for execution. This function is performed by the opSys3ToOpSys2FileTransfer object within the opSys2TargetPlatform object, which may implement a common file transfer mechanism such as FTP.

In the projectYProcessingConfiguration example, there are multiple target platforms (opSys2 and opSys3). As a result, the moveProcessingOutput( ) method on the opSys3TargetPlatform is also called (step 21). This step moves the processed code to the opSys3TargetPlatform. This function is performed by the protocolABCFileTransfer object within the opSys3TargetPlatform object, which may implement FTP or another suitable file transfer mechanism.

As the similarity of the two examples above illustrate, the framework provides an extremely flexible and powerful tool for implementing any number of processing configurations by simply defining objects that implement the features specific to a particular processing configuration. For example, any number of processing tools may be enabled by the framework delegating to their native functions for candidate collection, dependency checking, currency checking, and command assembling, which functions have been encapsulated in a concrete subclass of a framework class. The framework even gives the capability to mix and match between processing tools. Thus, the candidate collection may be from one tool, the dependency checking from a different tool, and so on. The preferred embodiment disclosed herein implements the native functions of one tool so that a programmer may use that tool regardless of the platform the code is stored on, the platform on which he or she is processing code, or on which the code will eventually run. This also gives the programmer the possibility of processing source code in a "stand alone" configuration, when detached from the normal programming environment, by simply running the native processing tools of the processing platform. If the processing configuration the programmer has been using in the programming environment delegates to the native processing tools, the programmer will have little trouble converting from the normal programming environment to stand-alone operation. In addition to enabling a large number of processing tools, the framework allows any combination of platforms to be specified for development, library, processing, and target. Thus, the framework could readily support a programming environment on an Apple McIntosh platform, with source code stored on a UNIX library platform, with processing on an AIX platform, with Windows 95 as the target platform.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the disclosure herein specifically relates to the processing of source code in a computer programming environment, it is equally within the scope of the invention to process other items, such as documents in a document processing system.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

An other relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

What is claimed is:

1. A computer system, the computer system comprising:
   a central processing unit; and
   a main memory coupled to the central processing unit, the main memory containing a framework that provides an extensible source code processing system for processing at least one source code module within a source code program, the framework comprising at least one extensible class, the framework executing on the central processing unit.

2. The computer system of claim 1 wherein the framework defines a processing configuration class comprising:
   at least one processing configuration object that defines at least one processing configuration; and
   a first set of object methods to effect the processing of the at least one source code module.

3. The computer system of claim 2 wherein the first set of object methods collect a list of candidate source code modules including the at least one source code module, to check the dependencies of the at least one source code module to other modules in the source code program, to check the currency of the at least one source code module, and to assemble commands for the processing configuration to cause the at least one source code module to be processed.

4. The computer system of claim 2 wherein the first set of object methods in the processing configuration class includes at least one method to distribute the source code processing to at least one external computer system.

5. The computer system of claim 2 wherein the framework further defines a candidate collector class, a dependency checker class, a currency checker class, and a command assembler class, and wherein the processing configuration class has a "has a" relationship with each of the candidate collector class, the currency checker class, and the dependency checker class, and has a using relationship with the command assembler class.

6. The computer system of claim 5 wherein the processing configuration class, the candidate collector class, the dependency checker class, the currency checker class, and the command assembler class are extensible classes of the framework, the implementation of which by a user defines the at least one processing configuration.

7. The computer system of claim 1 wherein the framework defines a candidate collector class comprising:
   at least one candidate collector object; and
   a second set of object methods that determine a set of initial candidate modules for processing.

8. The computer system of claim 7 wherein the framework further defines a dependency checker class, a currency checker class, and a command assembler class.

9. The computer system of claim 8 wherein the candidate collector class, the dependency checker class, the currency checker class, and the command assembler class are extensible classes of the framework, the implementation of which by a user defines at least one native processing tool for processing the at least one source code module.

10. The computer system of claim 1 wherein the framework defines a dependency checker class comprising:
    at least one dependency checker object; and
    a third set of object methods that determine a set of all candidate modules for processing.

11. The computer system of claim 10 wherein the framework further defines a candidate collector class, a currency checker class, and a command assembler class.

12. The computer system of claim 11 wherein the candidate collector class, the dependency checker class, the currency checker class, and the command assembler class are extensible classes of the framework, the implementation of which by a user defines at least one native processing tool for processing the at least one source code module.

13. The computer system of claim 1 wherein the framework defines a currency checker class comprising:
    at least one currency checker object; and
    a fourth set of object methods that determine a set of candidate modules for processing that are out of date.

14. The computer system of claim 13 wherein the framework further defines a candidate collector class, a dependency checker class, and a command assembler class.

15. The computer system of claim 14 wherein the candidate collector class, the dependency checker class, the currency checker class, and the command assembler class are extensible classes of the framework, the implementation of which by a user defines at least one native processing tool for processing the at least one source code module.

16. The computer system of claim 1 wherein the framework defines a command assembler class comprising:
    at least one command assembler object; and
    a fifth set of object methods that determine a set of commands for processing the at least one source code module.

17. The computer system of claim 16 wherein the framework further defines a candidate collector class, a dependency checker class, and a currency checker class.

18. The computer system of claim 17 wherein the candidate collector class, the dependency checker class, the currency checker class, and the command assembler class are extensible classes of the framework, the implementation of which by a user defines at least one native processing tool for processing the at least one source code module.

19. The computer system of claim 1 wherein the framework comprises:
    at least one processing configuration object that defines at least one processing configuration, the processing configuration object including a first set of object methods to collect a list of candidate source code modules including the at least one source code module, to check the dependencies of the at least one source code module to other modules in the source code program, to check the currency of the at least one source code module, and to assemble commands for the processing configuration to cause the at least one source code module to be processed;
    at least one candidate collector object including a second set of object methods that determine a set of initial candidate modules for processing;
    at least one dependency checker object including a third set of object methods that determine a set of all candidate modules for processing from the set of initial candidate modules;

at least one currency checker object including a fourth set of object methods that determine a set of candidate modules for processing that are out of date from the set of all candidate modules; and at least one command assembler object including a fifth set of object methods that determine a set of all commands for processing the at least one source code module.

20. The computer system of claim 2 wherein the main memory contains an application program that supports an object oriented programming environment containing the framework, and wherein the framework is extended by providing information that implements the at least one processing configuration.

21. The computer system of claim 1 wherein the framework comprises:

core functions defined by at least one core class, wherein the implementation of the core functions is defined by the framework and cannot be modified by a user of the framework; and extensible functions defined by at least one extensible class, wherein the implementation of the extensible functions is defined by the user of the framework by extending the at least one extensible class.

22. A method for processing at least one source code module within a source code program, the method comprising the steps of:

providing an extensible object oriented framework mechanism that performs the processing of the at least one source code module according to extended portions of the framework mechanism that are customized to provide a desired processing configuration; and executing the object oriented framework mechanism on a computer system.

23. The method of claim 22 further including the step of: extending the framework mechanism to define the desired processing configuration.

24. The method of claim 22 further including the steps of: selecting at least one target platform;

selecting at least one processing platform;

implementing at least one processing tool native to the at least one processing platform by defining the extended portions; and implementing the desired processing configuration by defining the extended portions in accordance with the selected at least one target platform and the selected at least one processing platform.

25. The method of claim 24 further including the steps of: selecting at least one library platform;

selecting at least one development platform;

the step of implementing the desired processing configuration including the step of defining the extended portions in accordance with the selected at least one library platform and the at least one development platform.

26. The method of claim 25 further including the steps of: determining an initial set of candidate modules within the source code program;

determining a second set of modules within the source code program that are dependent upon the initial set of candidate modules;

determining a third set of modules within the source code program, the third set comprising the modules within the second set that are out of date;

determining a fourth set of modules that comprise the modules to be processed, and determining a set of commands needed to process the modules within the fourth set.

27. The method of claim 26 further including the steps of:

distributing the set of commands across a plurality of computer systems;

each of the plurality of computer systems processing its respective commands to process the modules within the fourth set.

28. The method of claim 26 wherein the step of determining the initial set of candidate modules includes the step of creating an initial list of the candidate modules.

29. The method of claim 26 wherein the step of determining the second set of modules includes the step of creating a dependency list containing all modules within the source code program that may require processing in order to process the candidate modules within the initial list.

30. The method of claim 26 wherein the step of determining the third set of modules includes the step of creating an out of date list of modules within the dependency list that require processing in order to process the candidate modules within the initial list.

31. The method of claim 26 further including the steps of:

storing at least one of the processed modules in a library platform; and moving at least one of the processed modules to a target platform.

32. A program product comprising:

a framework mechanism for source code processing, the framework mechanism including an extensible source code processing system that performs source code processing according to extended portions of the framework mechanism, the framework mechanism comprising at least one extensible class; and signal bearing media bearing the framework mechanism.

33. The program product of claim 32 wherein the signal bearing media comprises recordable media.

34. The program product of claim 32 wherein the signal bearing media comprises transmission media.

35. The program product of claim 32 wherein the framework defines a processing configuration class comprising:

at least one processing configuration object that defines at least one processing configuration; and a first set of object methods to collect a list of candidate source code modules including the at least one source code module, to check the dependencies of the at least one source code module to other modules in the source code program, to check the currency of the at least one source code module, and to assemble commands for the processing configuration to cause the at least one source code module to be processed.

36. The program product of claim 35 wherein the first set of object methods in the processing configuration class includes at least one method to distribute the source code processing to at least one external computer system.

37. The program product of claim 35 wherein the framework further defines a candidate collector class, a dependency checker class, a currency checker class, and a command assembler class, and wherein the processing configuration class has a "has a" relationship with each of the candidate collector class, the currency checker class, and the dependency checker class, and has a using relationship with the command assembler class.

38. The program product of claim 37 wherein the processing configuration class, the candidate collector class, the dependency checker class, the currency checker class, and the command assembler class are extensible classes of the framework, the implementation of which by a user defines the at least one processing configuration.

39. An apparatus having a memory containing an object oriented framework mechanism, the framework mechanism comprising:

at least one candidate collector object including a second set of object methods that determine a set of initial candidate modules for processing;

at least one dependency checker object including a third set of object methods that determine a set of all candidate modules for processing from the set of initial candidate modules;

at least one currency checker object including a fourth set of object methods that determine a set of candidate modules for processing that are out of date from the set of all candidate modules; and at least one command assembler object including a fifth set of object methods that determine a set of all commands for processing the at least one source code module.

40. The object oriented framework mechanism of claim 39 wherein the framework mechanism further defines a processing configuration class that has a "has a" relationship to each of the candidate collector class, the dependency checker class, and the currency checker class, and that has a using relationship with the command assembler class.

41. The object oriented framework mechanism of claim 39 wherein the framework comprises:

core functions defined by at least one core class, wherein the implementation of the core functions is defined by the framework and cannot be modified by a user of the framework; and extensible functions defined by at least one extensible class, wherein the implementation of the extensible functions is defined by the user of the framework by extending the at least one extensible class.

42. A method for performing source code processing of at least one source code module within a source code program, the method comprising the steps of:

(A) providing at least one processing configuration object that defines at least one processing configuration, the processing configuration object including a first set of object methods to effect the processing of the at least one source code module;

(B) providing at least one candidate collector object including a second set of object methods that determine a set of initial candidate modules for processing;

(C) providing at least one dependency checker object including a third set of object methods that determine a set of all candidate modules for processing from the set of initial candidate modules;

(D) providing at least one currency checker object including a fourth set of object methods that determine a set of candidate modules for processing that are out of date including the at least one source code module;

(E) providing at least one command assembler object including a fifth set of object methods that determine a set of all commands for processing the at least one source code module;

(F) providing an object oriented framework mechanism that comprises the at least one candidate collector object, the at least one dependency checker object, the at least one currency checker object, and the at least one command assembler object, and wherein the object oriented framework mechanism performs the processing of the at least one source code module according to extended portions of the framework mechanism that are customized to provide a desired processing configuration; and (G) executing the object oriented framework mechanism on a computer system to process the at least one source code module.

43. The method of claim 42 further including the step of:
extending the framework mechanism to define the desired processing configuration.

44. The method of claim 42 further including the steps of:
selecting at least one target platform;
selecting at least one processing platform;
implementing at least one processing tool native to the at least one processing platform by defining the extended portions; and
implementing the desired processing configuration by defining the extended portions in accordance with the selected at least one target platform and the selected at least one processing platform.

45. The method of claim 44 further including the steps of:
selecting at least one library platform;
selecting at least one development platform;
the step of implementing the desired processing configuration including the step of defining the extended portions in accordance with the selected at least one library platform and the at least one development platform.

46. The method of claim 45 further including the steps of:
determining an initial set of candidate modules within the source code program;
determining a second set of modules within the source code program that are dependent upon the initial set of candidate modules;
determining a third set of modules within the source code program, the third set comprising the modules within the second set that are out of date;
determining a fourth set of modules that comprise the modules to be processed; and
determining a set of commands needed to process the modules within the fourth set.

47. The method of claim 46 further including the steps of:
distributing the set of commands across a plurality of computer systems;
each of the plurality of computer systems processing its respective commands to process the modules within the fourth set.

48. The method of claim 46 wherein the step of determining the initial set of candidate modules includes the step of creating an initial list of the candidate modules.

49. The method of claim 46 wherein the step of determining the second set of modules includes the step of creating a dependency list containing all modules within the source code program that may require processing in order to process the candidate modules within the initial list.

50. The method of claim 46 wherein the step of determining the third set of modules includes the step of creating an out of date list of modules within the dependency list that require processing in order to process the candidate modules within the initial list.

51. The method of claim 46 further including the steps of:
storing at least one of the processed modules in a library platform; and moving at least one of the processed modules to a target platform.

52. A program product comprising:
(A) an object oriented framework mechanism for processing at least one source code module within a source code program, the object oriented framework mechanism comprising at least one extensible class, the object oriented framework mechanism including at least one processing configuration object that defines at least one processing configuration, the processing configuration object including a first set of object methods to effect the processing of the at least one source code module, the object oriented framework mechanism further including at least one candidate collector object, the candidate collector object including a second set of object methods that determine a set of initial candidate modules for processing, the object oriented framework mechanism further including at least one dependency checker object including a third set of object methods that determine a set of all candidate modules for processing from the set of initial candidate modules, the object oriented framework mechanism further including at least one currency checker object including a fourth set of object methods that determine a set of candidate modules for processing that are out of date, the object oriented framework mechanism further including at least one command assembler object including a fifth set of object methods that determine a set of all commands for processing the at least one source code module, wherein the object oriented framework mechanism performs the processing of the at least one source code module according to extended portions of the framework mechanism that are customized to provide a desired processing configuration; and
(B) signal bearing media bearing the object oriented framework mechanism.

53. The program product of claim 52 wherein the signal bearing media comprises recordable media.

54. The program product of claim 52 wherein the signal bearing media comprises transmission media.

55. The program product of claim 52 wherein the first set of object methods in the processing configuration class includes at least one method to distribute the source code processing to at least one external computer system.

56. The program product of claim 52 wherein the framework further defines a candidate collector class, a dependency checker class, a currency checker class, and a command assembler class, and wherein the processing configuration class has a "has a" relationship with each of the candidate collector class, the currency checker class, and the dependency checker class, and that has a using relationship with the command assembler class.

57. The program product of claim 56 wherein the processing configuration class, the candidate collector class, the dependency checker class, the currency checker class, and the command assembler class are extensible classes of the framework, the implementation of which by a suer defines the at least one processing configuration.

58. An apparatus having a memory containing an object oriented framework mechanism that performs source code processing of at least one source code module within a source code program, the framework mechanism comprising:
at least one core class wherein the implementation of the core class is defined by the framework and cannot be modified by a user of the framework; and
at least one extensible class wherein the implementation of the extensible class is defined by the user of the framework, by extending the at least one extensible class, thereby defining at least one processing configuration for processing the at least one source code module.

59. The object oriented framework mechanism of claim 58 further comprising:
at least one processing configuration object that defines at least one processing configuration, the processing configuration object including a first set of object methods to collect a list of candidate source code modules including the at least one source code module, to check the dependencies of the at least one source code module to other modules in the source code program, to check the currency of the at least one source code module, and to assemble commands for the processing configuration to cause the at least one source code module to be processed;
at least one candidate collector object including a second set of object methods that determine a set of initial candidate modules for processing;
at least one dependency checker object including a third set of object methods that determine a set of all candidate modules for processing from the set of initial candidate modules;
at least one currency checker object including a fourth set of object methods that determine a set of candidate modules for processing that are out of date from the set of all candidate modules; and
at least one command assembler object including a fifth set of object methods that determine a set of all commands for processing the at least one source code module.

60. The object oriented framework mechanism of claim 59 wherein the framework mechanism further defines a candidate collector class, a dependency checker class, a currency checker class, and a command assembler class, and wherein the processing configuration class has a "has a" relationship with each of the candidate collector class, the currency checker class, and the dependency checker class, and that has a using relationship with the command assembler class.

61. The object oriented framework mechanism of claim 58 wherein the main memory contains an application program that supports an object oriented programming environment containing the framework, and wherein the framework is extended by providing information that implements the at least one processing configuration.

62. A method for processing at least one source code module within a source code program using a computer system having a central processing unit and a main memory, the main memory having an application program that provides an object oriented programming environment, the method comprising the steps of:
(A) providing in the application program an object oriented framework mechanism that performs the processing of the at least one source code module according to extended portions of the framework mechanism that are customized to provide a desired processing configuration, the framework mechanism including:
a set of core functions wherein the implementation of the core functions is defined by the framework and cannot be modified by a user of the framework mechanism; and
a set of extensible functions wherein the implementation of the extensible functions is defined by the user of the framework mechanism;

(B) extending the extensible functions in the framework mechanism to define particular objects having predetermined protocols and defining particular object methods that perform the processing of the at least one source code module, the extensible functions defining the desired processing configuration;

(C) generating an executable source code processing system by integrating together the extensible functions and the core functions; and (D) executing the executable source code processing system on the computer system to perform the processing of the at least one source code module.

63. The method of claim 62 further including the steps of:

selecting at least one target platform;

selecting at least one processing platform;

selecting at least one library platform;

selecting at least one development platform;

implementing at least one processing tool native to the at least one processing platform by defining the extended portions;

implementing the desired processing configuration by defining the extended portions in accordance with the selected at least one target platform, the selected at least one processing platform, the selected at least one library platform, and the selected at least one development platform;

determining an initial set of candidate modules within the source code program by creating an initial list of the candidate modules;

determining a second set of modules within the source code program that are dependent upon the initial set of candidate modules by creating a dependency list containing all modules within the source code program that may require processing in order to process the candidate modules within the initial list;

determining a third set of modules within the source code program, the third set comprising the modules within the second set that are out of date by creating an out of date list of modules within the dependency list that require processing in order to process the candidate modules within the initial list;

determining a fourth set of modules that comprise the modules to be processed;

determining a set of commands needed to process the modules within the fourth set;

processing the set of commands to process the at least one source code module in the fourth set;

storing at least one of the processed modules in a library platform; and moving at least one of the processed modules to a target platform.

64. The method of claim 63 wherein the step of processing the set of commands includes the steps of:

distributing the set of commands across a plurality of computer systems; and each of the plurality of computer systems processing its respective commands to process the modules within the fourth set.

65. A program product comprising:

an object oriented framework mechanism for processing at least one source code module within a source code program, the framework mechanism including at least one core class wherein the implementation of the core class is defined by the framework and cannot be modified by a user of the framework, the framework mechanism further including at least one extensible class wherein the implementation of the extensible class is defined by the user of the framework by extending the at least one extensible class, thereby defining a processing configuration that governs the operation of the framework mechanism; and signal bearing media bearing the object oriented framework mechanism.

66. The program product of claim 65 wherein the signal bearing media comprises recordable media.

67. The program product of claim 65 wherein the signal bearing media comprises transmission media.

68. The program product of claim 65 wherein the framework comprises:

at least one processing configuration object that defines at least one processing configuration, the processing configuration object including a first set of object methods to effect the processing of the at least one source code module;

at least one candidate collector object including a second set of object methods that determine a set of initial candidate modules for processing;

at least one dependency checker object including a third set of object methods that determine a set of all candidate modules for processing from the set of initial candidate modules;

at least one currency checker object including a fourth set of object methods that determine a set of candidate modules for processing that are out of date;

at least one command assembler object including a fifth set of object methods that determine a set of commands for processing the at least one source code module;

wherein the object oriented framework mechanism performs the processing of the at least one source code module according to extended portions of the framework mechanism that are customized to provide a desired processing configuration.

69. The program product of claim 68 wherein the first set of object methods in the processing configuration class includes at least one method to distribute the source code processing to at least one external computer system.

70. The computer system of claim 1 wherein the framework processes the at least one source code module for execution on a plurality of platforms.

71. The method of claim 22 further comprising the step of:

the framework mechanism processing the at least source code module for execution on a plurality of platforms.

72. The program product of claim 32 wherein the framework mechanism processes the at least one source code module for execution on a plurality of platforms.

* * * * *